United States Patent
Ueno et al.

(10) Patent No.: US 11,879,816 B2
(45) Date of Patent: Jan. 23, 2024

(54) VIBRATION CONTROL SYSTEM

(71) Applicant: IMV CORPORATION, Osaka (JP)

(72) Inventors: Kazuyoshi Ueno, Osaka (JP); Yoshikado Yamauchi, Osaka (JP); Yuji Nakaura, Osaka (JP)

(73) Assignee: IMV CORPORATION, Osaka (JP)

(*) Notice: Subject to any disclaimer, the term of this patent is extended or adjusted under 35 U.S.C. 154(b) by 309 days.

(21) Appl. No.: 17/280,993

(22) PCT Filed: Oct. 21, 2019

(86) PCT No.: PCT/JP2019/041305
§ 371 (c)(1),
(2) Date: Mar. 29, 2021

(87) PCT Pub. No.: WO2020/158068
PCT Pub. Date: Aug. 6, 2020

(65) Prior Publication Data
US 2021/0356352 A1 Nov. 18, 2021

(30) Foreign Application Priority Data

Jan. 31, 2019 (JP) ................. 2019-015493

(51) Int. Cl.
*G01M 7/02* (2006.01)
(52) U.S. Cl.
CPC ............ *G01M 7/022* (2013.01); *G01M 7/025* (2013.01)
(58) Field of Classification Search
None
See application file for complete search history.

(56) References Cited

U.S. PATENT DOCUMENTS

| 5,012,428 A | 4/1991 | Ueno et al. |
| 2007/0185620 A1 | 9/2007 | Van Baren |

(Continued)

FOREIGN PATENT DOCUMENTS

| JP | S59-2041 B2 | 1/1984 |
| JP | H06-5192 B2 | 1/1994 |

(Continued)

OTHER PUBLICATIONS

International Search Report for International Application No. PCT/JP2019/041305, dated jan. 21, 2020.

(Continued)

*Primary Examiner* — Matthew G Marini
(74) *Attorney, Agent, or Firm* — Jason H. Vick; Sheridan Ross, PC

(57) ABSTRACT

A vibration control device, while applying Gaussian vibration that matches a target vibration physical quantity PSD to a test piece, makes a corresponding vibration physical quantity non-Gaussian. Using a response vibration physical quantity PSD and a target vibration physical quantity PSD, a control vibration physical quantity PSD calculation generates a control vibration physical quantity PSD for generating a drive signal. A PSD conversion converts the control vibration physical quantity PSD into a control corresponding vibration physical quantity PSD of another dimension. Using the control corresponding vibration physical quantity PSD, a control corresponding vibration physical quantity waveform calculation calculates a control corresponding vibration physical quantity waveform that is non-Gaussian. At least based on the control characteristics and the control corresponding vibration physical quantity waveform, a drive waveform calculation generates a next drive waveform such that vibration that matches the control corresponding vibration physical quantity waveform is applied to a test piece.

12 Claims, 21 Drawing Sheets

(56) References Cited

U.S. PATENT DOCUMENTS

2010/0305886 A1* 12/2010 Zhuge .................... G05B 19/19
                                                         702/56
2014/0129030 A1    5/2014  Zhuge et al.

FOREIGN PATENT DOCUMENTS

| JP | H06-70597 | B2 | 9/1994 | | |
|----|-----------|----|--------|---|---|
| JP | 2012-127674 | A | 7/2012 | | |
| JP | 2012-233814 | A | 11/2012 | | |
| JP | 2013-88125 | A | 5/2013 | | |
| JP | 2013-096845 | A | 5/2013 | | |
| JP | 5420621 | B2 | 2/2014 | | |
| JP | 6015192 | B2 | 10/2016 | | |
| JP | 2017-78591 | A | 4/2017 | | |
| JP | 6235376 | B2 | 11/2017 | | |
| JP | 2018-004504 | A | 1/2018 | | |
| JP | 2018-21781 | A | 2/2018 | | |
| WO | WO-2006017086 | A1 * | 2/2006 | ............ | G01M 7/022 |

OTHER PUBLICATIONS

Written Opinion for International Application No. PCT/JP2019/041305, dated Jan. 21, 2020.
European Search Report for corresponding European Patent Application No. 19913884.3, dated May 17, 2022.
Notification of Reasons for Refusal (Including Translation) for corresponding Japanese Patent Application No. 2019-015493, dated Jan. 12, 2021.
Notification of Reasons for Refusal (Including Translation) for corresponding Japanese Patent Application No. 2019-015493, dated Mar. 29, 2021.
Notification of Reasons for Refusal (Including Translation) for corresponding Japanese Patent Application No. 2021-011262, dated Oct. 4, 2021.
International Preliminary Report onn Patentability for International Application No. PCT/JP2019/041305, dated Aug. 12, 2021.

* cited by examiner

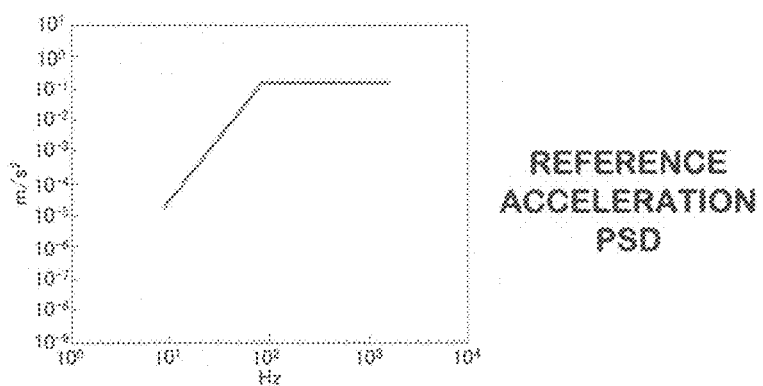
FIG.5A — REFERENCE ACCELERATION PSD
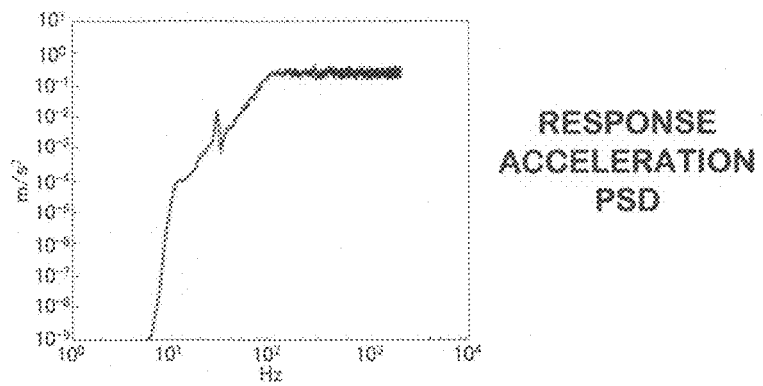
FIG.5B — RESPONSE ACCELERATION PSD
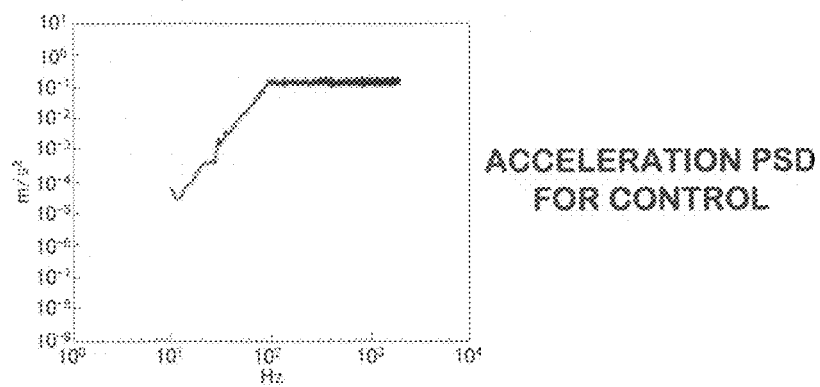
FIG.5C — ACCELERATION PSD FOR CONTROL
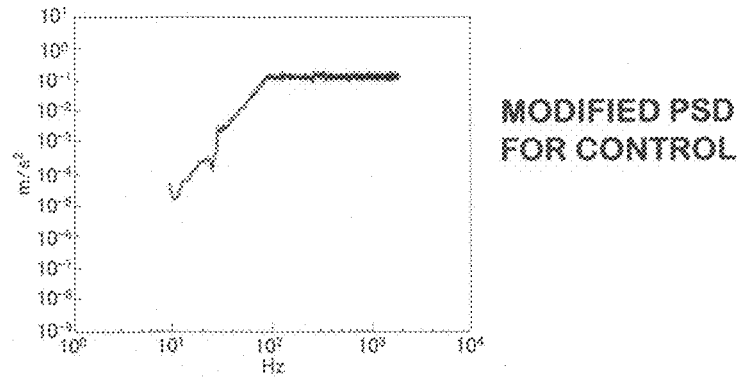
FIG.5D — MODIFIED PSD FOR CONTROL

VIBRATION CONTROL SYSTEM

CROSS-REFERENCE TO RELATED APPLICATIONS

This application is a national stage application under 35 U.S.C. 371 of PCT Application No. PCT/JP2019/041305 having an international filing date of 21 Oct. 2019, which designated the United States, which PCT application claimed the benefit of Japanese Application No. 2019-015493, filed 31 Jan. 2019, each of which are incorporated herein by reference in their entirety.

TECHNICAL FIELD

One exemplary aspect of the present invention relates to a vibration control system for controlling vibration generated by a vibration generator in a vibration tester that is used to simulate a vibration environment.

BACKGROUND ART

A random vibration test is a method for experimentally verifying that performance, reliability, and durability of a test object satisfies a desired design by subjecting the test object to a prescribed vibration environment and checking a state of the test object during the vibration test or after the test. In general, a goal of the test is achieved by reference acceleration PSD (power spectral density). Acceleration vibration used for excitation is requested "to be stationary Gaussian random vibration".

However, the concept of Gaussian distribution (normal distribution) includes that, in principle, acceleration with an extremely large (theoretically infinite) peak occurs with an extremely low probability (being just about nil). It is impossible to create a system that literally reproduces the above. In addition, preparation for the extremely large peak, which hardly occurs, means a significant waste of effort. Thus, when the system is actually realized, a condition is relaxed to rationally achieve the following, a "probability density function (PDF) includes a signal that is at least 3σ or higher according to the Gaussian distribution".

In the present specification, hereinafter, the signal, for which the condition of a request for a Gaussian property to create the system under such meaning is relaxed, will simply be referred to as a "Gaussian signal" according to customary practice.

It is known that, when an acceleration signal of random vibration is the Gaussian signal, corresponding vibration waveform of velocity, displacement, jerk (a rate of change of the acceleration as a temporal change rate of the acceleration), or the like as a kinematic quantity of another dimension related to the same vibration also obeys to the Gaussian distribution. This is considered as part of the natural law observed extremely widely and applied also to unbiased random vibrations in general that is subject to the Central Limit Theorem.

For example, in regard to a system disclosed in U.S. Pat. No. 5,012,428 (corresponding to Japanese Examined Patent Application Publication JP1994-5192B (HEI6-5192B)) by the inventors of the present application, and incorporated herein by reference, a vibration control system for vibrating a test object according to an acceleration waveform with the Gaussian property while satisfying reference acceleration PSD is disclosed.

In addition, in Japanese Patent 5421971B (Japanese Laid-open Patent Application Publication JP2013-88125A) and Japanese Patent 6518631B (Japanese Laid-open Patent Application Publication JP2018-21781A by the inventors of the present application, and incorporated herein by reference, a vibration control system for vibrating a test object according to an acceleration waveform with a non-Gaussian property while satisfying the reference acceleration PSD is disclosed.

SUMMARY

However, it is requested to make any of the other kinematic quantities of the different dimensions, such as velocity, displacement, and jerk, have the "non-Gaussian property" while satisfying the request for the prescribed acceleration PSD. The techniques disclosed in above mentioned patent documents and Japanese Patent 1961722B (Japanese Laid-open Patent Application Publication JP1990-184906A) cannot meet such a request.

As an example, in regard to sensitivity of a human person related to sensing of a change in motion, sensitivity for the jerk is higher than sensitivity for the acceleration. Thus, in order to improve ride quality or alleviate a harmful effect on a body, a train, an elevator, a roller coaster, and the like, are designed to reduce a jerk amount. In such a case, in the case where the jerk amount included in a test waveform is changed from that in the Gaussian distribution according to the design, an experiment having a vibration condition that is close to an actual condition can be conducted as the random vibration test.

In addition, in general, the vibration tester has limitations on specifications related to the maximum velocity, maximum displacement, and the like in addition to the maximum excitation force and maximum acceleration that can be output according to the basic specifications. In the case where the signal of the velocity or the displacement exceeds the maximum specification thereof even for a moment while the acceleration falls within the maximum specification thereof, a safety system is actuated at the moment, which possibly interrupts the test. In such a case, as long as a maximum peak value of the velocity or the displacement can rationally be controlled to a certain value or lower, it is possible to reliably avoid such a situation where the vibration exceeding a limit of such an amount occurs to stop the test regardless of a coincidence.

In an electrodynamic vibration generator, a maximum velocity of a vibrator (an armature) is restricted by the maximum voltage that can be output by the amplifier, and maximum displacement thereof is restricted by a mechanical dimension that is related to a movable range of the vibrator. In the case where the maximum voltage that can be output by the amplifier is insufficient, as long as a reference velocity waveform is clipped in advance such that a maximum peak value thereof falls within a limit value (in this way, the velocity waveform acquires a non-Gaussian property. In order to keep the non-Gaussian property, such control has to be executed that a response velocity waveform observed at a response point remains the same as the waveform itself) and the acceleration waveform corresponding to this vibration motion can maintain the request for the PSD, the above problem can be solved while the goal of the test is satisfied.

Similarly, in the case where displacement limitation is problematic, as long as a Gaussian acceleration random signal with the acceleration PSD requested for the test is achieved at a response point and a corresponding displacement signal can be reproduced as a non-Gaussian random signal, a peak value of which reliably falls within a certain value, the vibration test can be conducted without a possibility of discontinuation of the test caused by excess of the displacement limitation.

Here, similar to the above, it is requested to make the drive signal have the "non-Gaussian property" while satisfying the request for PSD of the prescribed kinematic quantity.

In addition, it is generally requested to vibrate the test object that is placed on the vibration generator with vibration having a desired waveform. As disclosed in Japanese Patent 1961722B (Japanese Laid-open Patent Application Publication JP1990-184906A), the inventors of the present application have already invented a system that meets such a request. However, in this system, the vibration of the test object is detected by an acceleration sensor. Thus, the vibration can only be controlled such that the acceleration waveform of the vibration matches to a reference acceleration waveform that is determined in advance.

In regard to a physical quantity of the other dimension such as a velocity waveform, the vibration of the test object can be controlled by providing a velocity sensor or the like and applying the reference waveform of the desired vibration. However, the provisioning of many types of sensors is complicated and thus is not preferred.

For this reason, such a vibration control system is desired that can execute acceleration PSD control by using an acceleration sensor (or a sensor for the other dimension) while executing waveform control of the kinematic quantity having a different dimension from acceleration.

It is one object of the present invention to provide a vibration control system capable of solving any of the above problems and creating various additional values upon the conducting of a test.

In the present specification, with respect to a vibration physical quantity of a certain dimension, a vibration physical quantity of another different dimension indicating behaviors of the same vibration will be referred to as a corresponding physical quantity. Some aspects of the present invention each of which can be applied independently are described as follows:

(1) (2) A vibration control system according to the present invention comprises: a vibration physical quantity detection sensor which detects a vibration physical quantity of a test object that is vibrated by a vibration generator operated at least based on a drive waveform; means for calculating a response vibration physical quantity PSD by subjecting a response vibration physical quantity waveform from the vibration physical quantity detection sensor to the Fourier transform; means for calculating corresponding vibration physical quantity PSD for control of a different dimension, which corresponds to the vibration physical quantity PSD for control, at least based on the response vibration physical quantity PSD and reference vibration physical quantity PSD; means for calculating a non-Gaussian random waveform of the corresponding vibration physical quantity for control by subjecting spectrum data, which is generated from the corresponding vibration physical quantity PSD for control, to the inverse Fourier transform in order to obtain the desired non-Gaussian characteristics in the time-domain, and setting the non-Gaussian random waveform of the corresponding vibration physical quantity as a corresponding vibration physical quantity waveform for control; means for calculating the drive waveform at least based on the corresponding vibration physical quantity waveform for control with inverse characteristics of transfer characteristics of a system including a vibration generator and the test object as the equalization object; and means for modifying the equalization characteristics at least based on the drive waveform and the response vibration Accordingly, it can be achieved to carry out the control where the corresponding vibration physical quantity has non-Gaussian characteristics, while the test object is vibrated according to the reference vibration physical quantity PSD with non-Gaussian characteristics.

(3) In the vibration control system according to the present invention, the means for calculating corresponding vibration physical quantity PSD for control includes: means for calculating vibration physical quantity PSD for control by comparing the response vibration physical quantity PSD and the reference vibration physical quantity PSD such that the response vibration physical quantity PSD matches to the reference vibration physical quantity PSD; and means for converting the vibration physical quantity PSD for control into the corresponding vibration physical quantity PSD for control of the different dimension.

Accordingly, corresponding vibration physical quantity PSD for control can be generated such that reference vibration physical quantity PSD matches to response vibration physical quantity PSD.

(4) In the vibration control system according to the present invention, the means for calculating corresponding vibration physical quantity PSD for control includes: means for converting the response vibration physical quantity PSD into response corresponding vibration physical quantity PSD of the different dimension; means for converting the reference vibration physical quantity PSD into reference corresponding vibration physical quantity PSD of the different dimension; and means for modifying the corresponding vibration physical quantity PSD for control by comparing the response corresponding vibration physical quantity PSD and the reference corresponding vibration physical quantity PSD such that the response corresponding vibration physical quantity PSD matches to the reference corresponding vibration physical quantity PSD.

Accordingly, corresponding vibration physical quantity PSD for control can be generated such that reference vibration physical quantity PSD matches response vibration physical quantity PSD.

(5) In the vibration control system according to the present invention, the means for calculating corresponding vibration physical quantity waveform for control includes: means for acquiring a Gaussian random waveform of the corresponding vibration physical quantity for control by subjecting amplitude spectrum data, which is generated from the corresponding vibration physical quantity PSD for control, to the inverse Fourier transform with providing uniformly distributed random phases; means for converting the Gaussian random waveform of the corresponding vibration physical quantity for control into the non-Gaussian random waveform at least based on non-Gaussian conversion characteristics; means for extracting the phase information of frequency components of a non-Gaussian signal phases by subjecting the non-Gaussian random waveform to the Fourier transform; and means for calculating the non-Gaussian random waveform of the corresponding vibration physical quantity for control by subjecting the corresponding vibration physical quantity PSD for control to the inverse Fourier transform by providing the non-Gaussian signal phases.

Accordingly, the test object can be vibrated according to the corresponding vibration physical quantity waveform for control by carrying out the control based on response vibration physical quantity and drive waveform.

(6) In the vibration control system according to the present invention, the means for calculating corresponding vibration physical quantity waveform for control includes: means for obtaining Gaussian random waveform of a corresponding vibration physical quantity for control by subjecting amplitude spectrum data, which is generated from the corresponding vibration physical quantity PSD for control, to the inverse Fourier transform with providing uniformly distributed random phases; and means for converting the Gaussian random waveform of the corresponding vibration physical quantity for control into the non-Gaussian random waveform at least based on non-Gaussian conversion characteristics such that the non-Gaussian random waveform of the corresponding vibration physical quantity for control is obtained.

Accordingly, the test object can be vibrated according to corresponding vibration physical quantity waveform for control by carrying out the control based on response vibration physical quantity and drive waveform.

(7) In the vibration control system according to the present invention, the non-Gaussian conversion characteristic is a ZMNL (Zero-Memory Non-Linear) function.

(8) In the vibration control system according to the present invention, the feature of the non-Gaussian conversion characteristics is to limit a peak value such that the Gaussian random waveform of the corresponding vibration physical quantity for control does not exceed a prescribed limit value, and in the case where the Gaussian random waveform of the corresponding vibration physical quantity for control does not exceed the limit value, said Gaussian random waveform of the corresponding vibration physical quantity for control is used as the non-Gaussian random waveform of the corresponding vibration physical quantity for control.

Accordingly, control can be achieved such that the corresponding vibration physical quantity waveform for control fits within limit.

(9) In the vibration control system according to the present invention, the means for calculating a drive waveform performs convolution operation on the corresponding vibration physical quantity waveform for control by using an impulse response as the equalization characteristics, so as to calculate the drive waveform, and the means for modifying equalization characteristics calculates the equalization characteristics as a reciprocal of a value obtained by dividing the corresponding vibration physical quantity with the vibration physical quantity transfer function, at least based on a spectrum of a response corresponding vibration physical quantity waveform, which is converted from the response vibration physical quantity waveform, and a spectrum of the drive waveform.

Accordingly, while the response waveform is detected by a vibration physical quantity, the test object can be vibrated according to the waveform of corresponding vibration physical quantity of different dimension

(10) In the vibration control system according to the present invention, the means for modifying equalization characteristics includes: means for calculating the vibration physical quantity transfer function at least based on the drive waveform and the response vibration physical quantity waveform; means for converting the vibration physical quantity transfer function into the corresponding vibration physical quantity transfer function; and means for calculating the equalization characteristics as a reciprocal of the corresponding vibration physical quantity transfer function.

Accordingly, while the response waveform is detected by a vibration physical quantity, the test object can be vibrated according to the waveform of corresponding vibration physical quantity of different dimension.

(11) In the vibration control system according to the present invention, the means for calculating drive waveform includes: means for converting the corresponding vibration physical quantity waveform for control into a non-Gaussian random waveform of the vibration physical quantity for control; and control means for performing the convolution operation on the physical vibration quantity waveform for control by using the impulse response of the reciprocal of the system including the vibration generator and the test object as the equalization characteristics, so as to calculate the drive waveform.

Accordingly, while the response waveform is detected by a vibration physical quantity, the test object can be vibrated according to the waveform of corresponding vibration physical quantity of different dimension

(12) In the vibration control system according to the present invention, the vibration physical quantity detection sensor is a sensor that detects any of displacement, velocity, acceleration, and jerk of vibration, and the vibration physical quantity is any of the displacement, the velocity, the acceleration, and the jerk.

Accordingly, the control can be carried out at any dimension concerning displacement, velocity, acceleration, and jerk of vibration.

(13) (14) A vibration control system in accordance with the present invention comprises: an acceleration sensor for detecting acceleration of a test object that is vibrated by a vibration generator operated at least based on a drive waveform; means for acquiring response acceleration PSD by subjecting a response acceleration waveform from the acceleration sensor to the Fourier transform; means for calculating vibration physical quantity PSD for control corresponding to acceleration PSD for control at least based on the response acceleration PSD and reference acceleration PSD, the vibration physical quantity PSD for control being displacement PSD for control, velocity PSD for control, or jerk PSD for control; means for obtaining Gaussian random waveform of a corresponding vibration physical quantity for control by subjecting amplitude spectrum data, which is generated from the displacement PSD for control, the velocity PSD for control, or the jerk PSD for control, to the inverse Fourier transform with providing uniformly distributed random phases, Gaussian random waveform of a corresponding vibration physical quantity for control being a Gaussian random waveform of the displacement for control, a Gaussian random waveform of the velocity for control, or a Gaussian random waveform of the jerk for control; determination means for providing drive waveform calculation means with the Gaussian random waveform of the displacement for control, the Gaussian random waveform of the velocity for control, or the Gaussian random waveform of the jerk for control as is as a displacement waveform for control, a velocity waveform for control, or a jerk waveform for control in the case where a portion that exceeds a limit value is not present in said Gaussian random waveform of the displacement for control, or said Gaussian random waveform of the velocity for control, or said Gaussian random waveform of the jerk for control in a prescribed unit period, and providing the drive waveform calculation means with a non-Gaussian random waveform of the displacement for control, a non-Gaussian random waveform of the velocity for control, or a non-Gaussian random waveform of the jerk for control, which is calculated by non-Gaussian conversion means, non-Gaussian signal phase extraction means, or waveform calculation means, as the displacement waveform for control, the velocity waveform for control, or the jerk waveform for control in the case where the portion that exceeds the limit value is present; means for calculating the drive waveform at least based on the displacement waveform for control, the velocity waveform for control, or the jerk waveform for control with inverse characteristics of a transfer function of a system including a vibration generator and the test object as equalization characteristics; means for calculating an acceleration transfer function at least based on the drive waveform and the response acceleration waveform; means for converting the acceleration transfer function into a displacement transfer function, a velocity transfer function, or a jerk transfer function; and inverse transfer function calculation means for calculating the equalization characteristics as a reciprocal of the displacement transfer function, the velocity transfer function, or the jerk transfer function.

Accordingly, it can be achieved to carry out the control where the corresponding vibration physical quantity has non-Gaussian characteristics, while the test object is vibrated according to the reference vibration physical quantity PSD with non-Gaussian characteristics.

(15) (17) A vibration control system for vibrating a test object in a manner to match a reference vibration physical quantity waveform of a second dimension that differs from a first dimension of a drive waveform for vibrating the test object and of a response vibration physical quantity waveform, with which vibration of the test object is detected in accordance with the present invention comprises: a vibration physical quantity detection sensor which detects a vibration physical quantity of the test object that is vibrated by a vibration generator operated at least based on the drive waveform, so as to output the response vibration physical quantity waveform; means for calculating the drive waveform at least based on the reference vibration physical quantity waveform by using an equalization characteristics as inverse characteristics of transfer characteristics of a system including a vibration generator and the test object; and means for modifying the equalization characteristics as a reciprocal of a second dimension transfer function at least based on the response vibration physical quantity waveform and the drive waveform, the second dimension transfer function being a ratio between a spectrum of the drive waveform and a spectrum of a second response vibration physical quantity waveform, which is generated by converting the response vibration physical quantity waveform into that of the second dimension.

Accordingly, while the response waveform is detected by the vibration physical quantity, the test object can be vibrated according to the waveform of corresponding vibration physical quantity of different dimension.

(16) (18) A vibration control system according to the present invention comprises: means for acquiring response vibration physical quantity PSD by subjecting a response vibration physical quantity waveform from the vibration physical quantity detection sensor to Fourier transform; means for calculating vibration physical quantity PSD for control at least based on the response vibration physical quantity PSD and the reference vibration physical quantity PSD such that the response vibration physical quantity PSD matches the reference vibration physical quantity PSD; and means for calculating vibration physical quantity waveform for control by subjecting spectrum data, which is generated from the vibration physical quantity PSD for control, to the inverse Fourier transform, and providing the vibration physical quantity waveform for control as the reference vibration physical quantity waveform to the drive waveform calculating means.

Accordingly, the test object can be vibrated where the control is carried out in order to match the response vibration physical quantity with the reference vibration physical quantity PSD and the response waveform matches with the reference waveform of corresponding vibration physical quantity of different dimension.

(19) In the vibration control system according to the present invention, the equalization characteristics modification means includes: means for calculating a first dimension transfer function at least based on the drive waveform and the response vibration physical quantity waveform; means for converting the first dimension transfer function into the second dimension transfer function; and inverse transfer function calculation means for calculating the equalization characteristics as a reciprocal of the second dimension transfer function.

Accordingly, while the response waveform is detected by the vibration physical quantity of first dimension, the test object can be vibrated according to the waveform of corresponding vibration physical quantity of different second dimension.

(20) In the vibration control system according to the present invention, the equalization characteristics modification means includes: response vibration physical quantity waveform conversion means for converting the response vibration physical quantity waveform into a second response vibration physical quantity waveform; means for calculating the second dimension transfer function at least based on the drive waveform and the second response vibration physical quantity waveform; and inverse transfer function calculation means for calculating the equalization characteristics as the reciprocal of the second dimension transfer function.

Accordingly, while the response waveform is detected by the vibration physical quantity of first dimension, the test object can be vibrated according to the waveform of corresponding vibration physical quantity of different second dimension.

(21) (22) A vibration control system according to the present invention comprises: a vibration physical quantity detection sensor which detects a vibration physical quantity of a test object that is vibrated by a vibration generator operated at least based on a drive waveform; means for acquiring response vibration physical quantity PSD by subjecting a response vibration physical quantity waveform from the vibration physical quantity detection sensor to the Fourier transform; means for controlling drive PSD at least based on the response vibration physical quantity PSD, reference vibration physical quantity PSD, the response vibration physical quantity waveform, and the drive waveform; and means for calculating a non-Gaussian random drive waveform by subjecting spectrum data, which is generated from the drive PSD, to the inverse Fourier transform, and setting the non-Gaussian random drive waveform as the drive waveform in order to obtain desired non-Gaussian characteristics.

Accordingly, the test object can be vibrated according to the reference vibration physical quantity PSD where the drive waveform is made non-Gaussian characteristics.

"means for calculating a response vibration physical quantity PSD" at least corresponds to step S2 in the embodiment.

"means for calculating vibration physical quantity PSD for control" at least corresponds to step S3 in the embodiment.

"means for calculating vibration physical quantity PSD for control" at least corresponds to step S3 in the embodiment.

"means for converting PSD" at least corresponds to step S4 in the embodiment.

"means for calculating Gaussian waveform of corresponding vibration physical quantity for control" at least corresponds to step S5 in the embodiment.

"means for converting Gaussian waveform into non-Gaussian waveform" at least corresponds to step S6 in the embodiment.

"means for extracting phase" at least corresponds to step S7 in the embodiment.

"means for converting to non-Gaussian" at least corresponds to step S8 in the embodiment.

"means for calculating drive waveform" at least corresponds to steps S11-S14 or steps S51-S54 in the embodiment.

"means for calculating transfer function" at least corresponds to step S17 or S57 in the embodiment.

"means for converting transfer function" at least corresponds to step S18 or S58 in the embodiment.

"means for calculating inverse-transfer function" at least corresponds to step S19 or S59 in the embodiment.

"program" is a concept that includes not only a program that can directly be executed by a CPU, processor or controller, but also a program and/or instructions in a source format, a program subjected to compression processing, an encrypted program, and/or the like.

Any one or more of the functions/means described herein and/or in association with the accompanying figures/flowcharts, can be encoded as instructions, stored in the memory and executed by the CPU/processor. The instructions can also be part of a control program running on an operating system (OS) with any one or more of the inputs, determinations, calculations and/or outputs capable of being displayed on the display and/or output to the vibration generator. Applicant has expressed these functions/means in an understandable format that includes one or more of mathematical formula, in prose, and/or in a flow chart(s), and thus have provided sufficient structure.

BRIEF DESCRIPTION OF DRAWINGS

FIG. 5A illustrates an example of reference acceleration PSD, FIG. 5B illustrates an example of response acceleration PSD, FIG. 5C illustrates an example of acceleration PSD for control, and FIG. 5D illustrates an example of modified acceleration PSD for control.

DESCRIPTION OF EMBODIMENTS

1. First Embodiment 1.1 Functional Configuration

Figure 1:
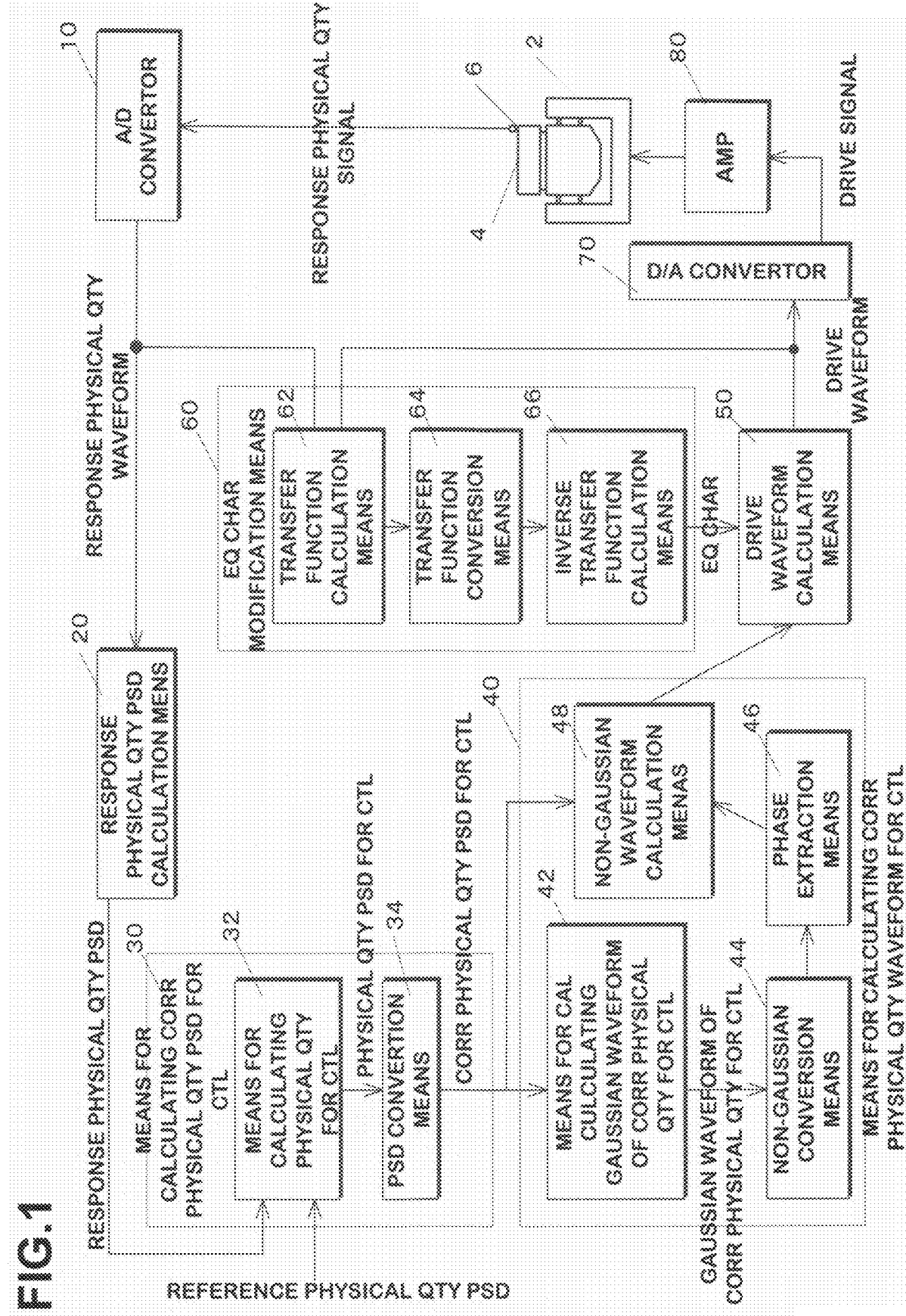
FIG. 1 is a functional block diagram of a vibration control system according to an embodiment of the present invention.

FIG. 1 is a functional configuration diagram of a vibration control system according to an embodiment of the present invention. In this embodiment, an amplifier 80, a vibration generator 2, a test object 4, and a vibration physical quantity detection sensor 6 are provided for control/evaluation by the vibration control system.

The test object 4 as a test target is placed on the vibration generator 2. The vibration physical quantity detection sensor 6 detects vibration of the test object 4 that is vibrated by the vibration generator 2. A displacement sensor, a velocity sensor, an acceleration sensor, a jerk sensor, or the like can be used as the vibration physical quantity detection sensor 6. A signal representing a response vibration physical quantity (a displacement signal, a velocity signal, an acceleration signal, a jerk signal, or the like) from the vibration physical quantity detection sensor 6 is converted into a response vibration physical quantity waveform (hereinafter referred as response physical quantity waveform) as digital data by an A/D converter 10. The response physical quantity waveform is data in which characteristics of the vibration is expressed by a dimension such as displacement, a velocity, acceleration, or jerk.

Response vibration physical quantity PSD calculation means 20 (hereinafter referred as response physical quantity PSD calculation means 20) performs the Fast Fourier Transform (FFT) on the response physical quantity waveform to calculate response vibration physical quantity PSD (hereinafter referred as response physical quantity PSD) thereof. Means 30 for calculating corresponding vibration physical quantity PSD for control (hereinafter referred as means 30 for calculating corresponding physical quantity PSD for control) calculates a corresponding vibration physical quantity PSD for control (hereinafter referred as corresponding physical quantity PSD for control) at least based on the response physical quantity PSD and reference vibration physical quantity PSD (hereinafter referred as reference physical quantity PSD).

In the present specification, with respect to a vibration physical quantity of a certain dimension, a vibration physical quantity of another different dimension indicating behaviors of the same vibration will be referred to as a corresponding physical quantity. Thus, the dimension of the above-described response physical quantity PSD differs from the dimension of the corresponding physical quantity PSD for control.

In this embodiment, the means 30 for calculating corresponding physical quantity PSD for control includes means 32 for calculating vibration physical quantity PSD for control (hereinafter referred as means 32 for calculating quantity PSD for control) and PSD conversion means 34. The means 32 for calculating control physical quantity PSD calculates vibration physical quantity PSD for control (hereinafter referred as physical quantity PSD for control) such that the response physical quantity PSD matches the reference physical quantity PSD. This is because, even when the vibration with the reference physical quantity PSD is applied to the vibration generator 2, the vibration of the test object 4 differs from the vibration indicated by the reference physical quantity PSD due to appropriateness or inappropriateness between presence of transfer characteristics of a system including the test object 4 and control resolution at the time of setting a non-linear fluctuation of the system or setting a control system. Thus, the physical quantity PSD for control is successively modified and calculated such that the response physical quantity PSD matches the reference physical quantity PSD.

The PSD conversion means 34 converts the thus-calculated physical quantity PSD for control into the corresponding physical quantity PSD for control of the different dimension. Thus, in this embodiment, control is executed by using the corresponding physical quantity of the different dimension from the dimension, the vibration physical quantity of which is detected.

Means 40 for calculating corresponding vibration physical quantity waveform for control (hereinafter referred as means 40 for calculating corresponding physical quantity waveform for control) calculates a corresponding vibration physical quantity waveform for control (hereinafter referred as corresponding physical quantity waveform for control) so as to achieve a desired non-Gaussian characteristics at least based on the corresponding physical quantity PSD for control.

In this embodiment, the means 40 for calculating corresponding physical quantity waveform for control includes means 42 for calculating Gaussian corresponding vibration physical quantity waveform for control, non-Gaussian conversion means 44, phase extraction means 46, and waveform calculation means 48.

The means 42 for Gaussian corresponding physical quantity waveform for control calculates a Gaussian random waveform of the corresponding physical quantity for control by providing the corresponding physical quantity PSD for control with uniformly distributed random phases. The non-Gaussian conversion means 44 calculates a non-Gaussian random waveform by processing the Gaussian random waveform of the corresponding physical quantity for control at least based on prescribed non-Gaussian characteristics. For example, the non-Gaussian conversion means 44 converts an amplitude of a corresponding physical quantity waveform for control by using a ZMNL function or the like, and performs an operation (clipping) to limit the amplitude of the corresponding physical quantity waveform for control such that the amplitude (an absolute value) does not exceed a prescribed value.

The phase extraction means 46 calculates frequency characteristics of phase components of this non-Gaussian random waveform. The waveform calculation means 48 calculates a non-Gaussian random waveform of the corresponding physical quantity for control at least based on the corresponding physical quantity PSD for control and phases thereof, and sets this as the corresponding physical quantity waveform for control.

Accordingly, as long as the test object 4 can be vibrated as indicated by this corresponding physical quantity waveform for control, it is possible to apply the vibration, the corresponding physical quantity of which is made to be non-Gaussian, to the test object 4 while satisfying the reference physical quantity PSD.

Drive waveform calculation means 50 modifies the corresponding physical quantity waveform for control to calculate a drive waveform at least based on an equalization characteristics, for which a transfer function of the system is considered.

Equalization characteristics modification means 60 successively updates the above equalization characteristics at least based on the response physical quantity waveform and the drive waveform.

In this embodiment, the equalization characteristics modification means 60 includes transfer function calculation means 62, transfer function conversion means 64, and inverse transfer function calculation means 66. The transfer function calculation means 62 calculates a vibration physical quantity transfer function (hereinafter referred as physical quantity transfer function) at least based on the response physical quantity waveform and the drive waveform. The transfer function conversion means 64 converts the physical quantity transfer function into a corresponding physical quantity transfer function. The inverse transfer function calculation means 66 inverts the corresponding physical quantity transfer function to calculate a corresponding vibration physical quantity inverse transfer function (hereinafter referred as corresponding physical quantity inverse transfer function).

The corresponding physical quantity inverse transfer function as the equalization characteristics, which is modified as described above, is used to calculate the drive waveform in the drive waveform calculation means 50.

The calculated drive waveform is converted into a drive signal by a D/A converter 70, is amplified by the amplifier 80, and is provided to the vibration generator 2.

1.2 Hardware Configuration

A description will hereinafter be made on a case where a random vibration test is performed under conditions that the acceleration PSD matches reference acceleration PSD, that the velocity that matches to or higher than a limit value, and the like. It is requested to control the velocity in a manner not to exceed the limit value in the case where there is a limitation on an output voltage of the amplifier 80.

Figure 2:
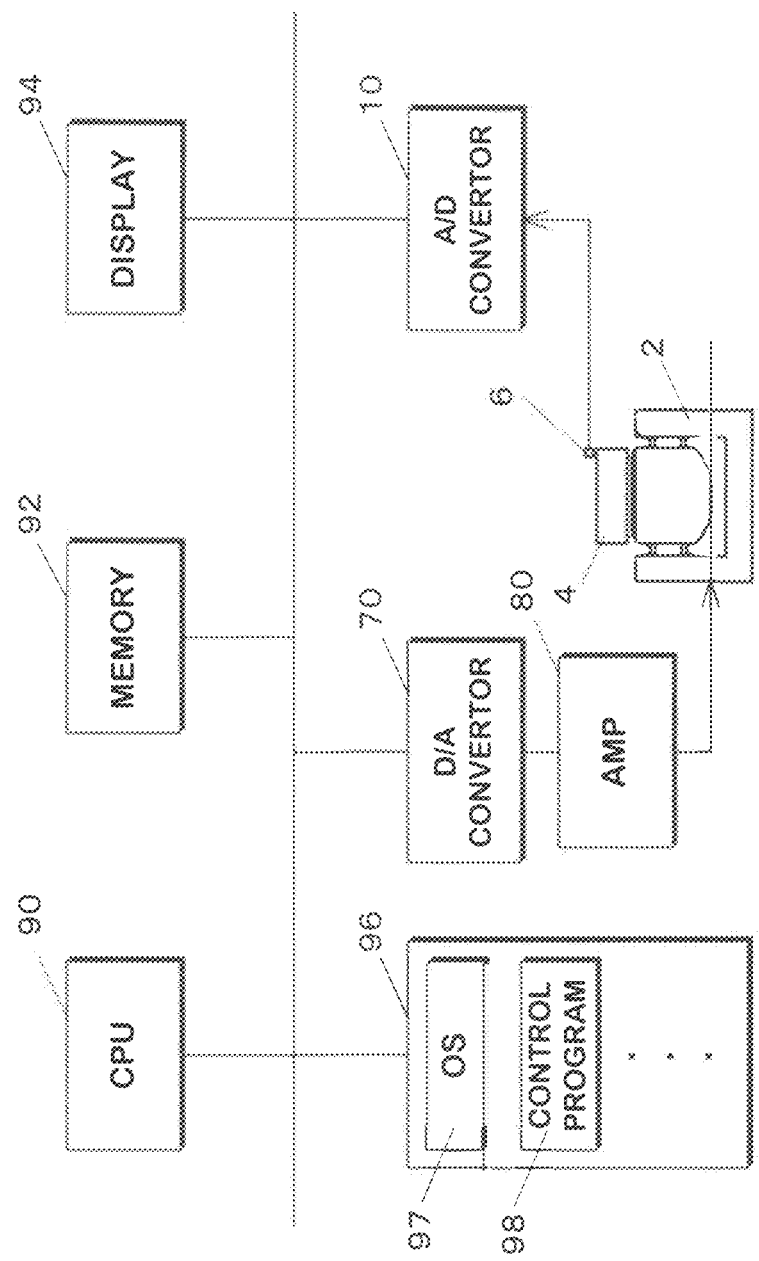
FIG. 2 illustrates a hardware configuration of the vibration control system.

FIG. 2 illustrates a hardware configuration of the vibration control system. The vibration generator 2 has a vibration table (not illustrated) on which the test object 4 is placed and fixed. The vibration generator 2 vibrates this vibration table. In order to detect this vibration, the test object 4 is provided with an acceleration sensor 6 as the vibration physical quantity detection sensor (hereinafter referred as physical quantity detection sensor).

In this embodiment, the acceleration sensor 6 is used to acquire the acceleration as a response vibration physical quantity (hereinafter referred as response physical quantity). However, a displacement sensor, a velocity sensor, and/or a jerk sensor may be used to acquire, as the response physical quantity, displacement, velocity, and/or jerk of the other dimension.

A memory 92, a touchscreen display 94, non-volatile memory 96, the D/A converter 70, and the A/D converter 10 are connected to a CPU 90. Here, output to the vibration generator 2 is provided as an analog signal to the vibration generator 2 via the D/A converter 70 and the amplifier 80. Meanwhile, input from the acceleration sensor 6 is imported as the digital data via the A/D converter 10.

In the non-volatile memory 96, an operating system 97 and a control program 98 are recorded. The control program 98 cooperates with the operating system 97 to exert a function thereof.

1.3 Vibration Control Processing

Figure 3:
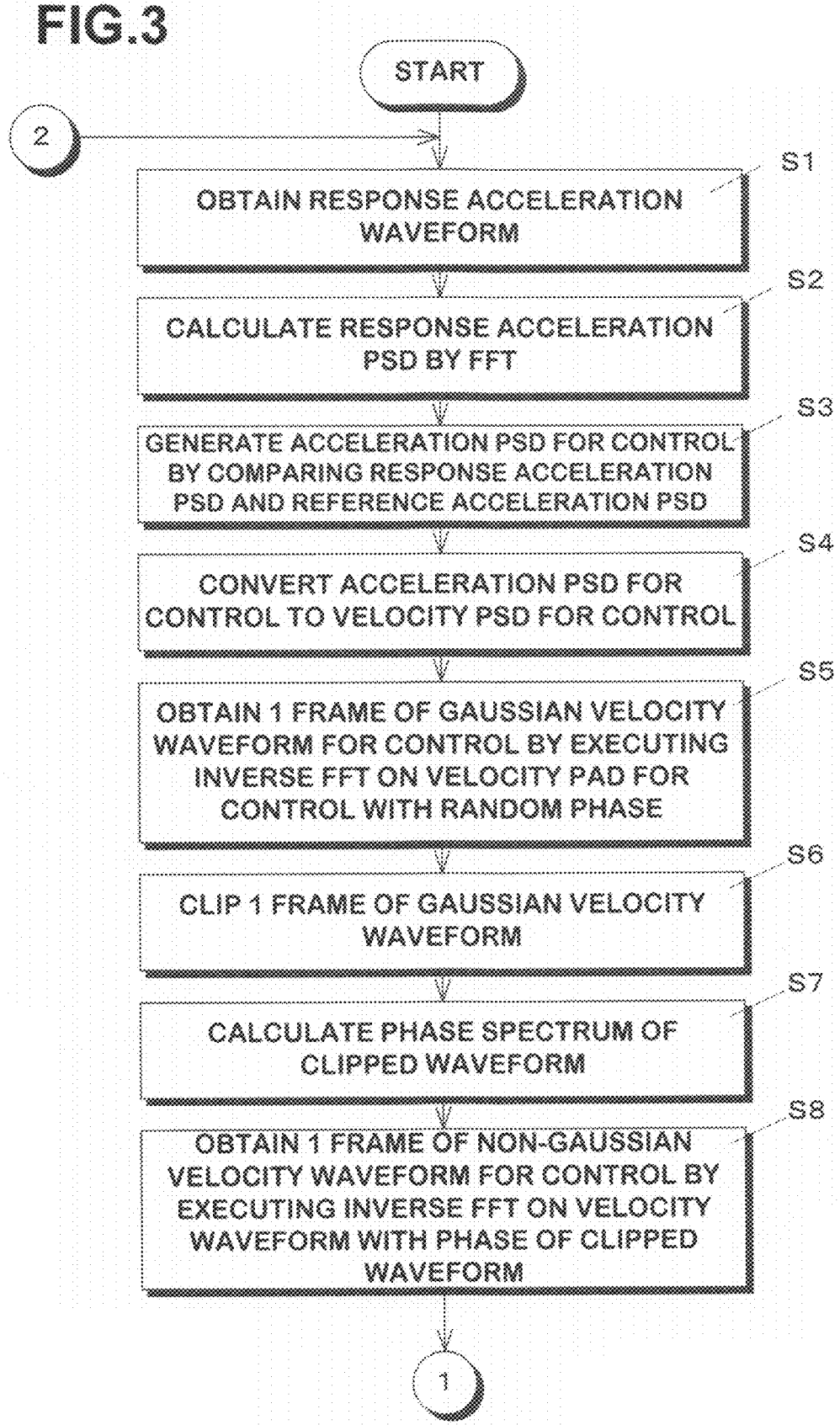
FIG. 3 is a flowchart of a vibration control program.
Figure 4:
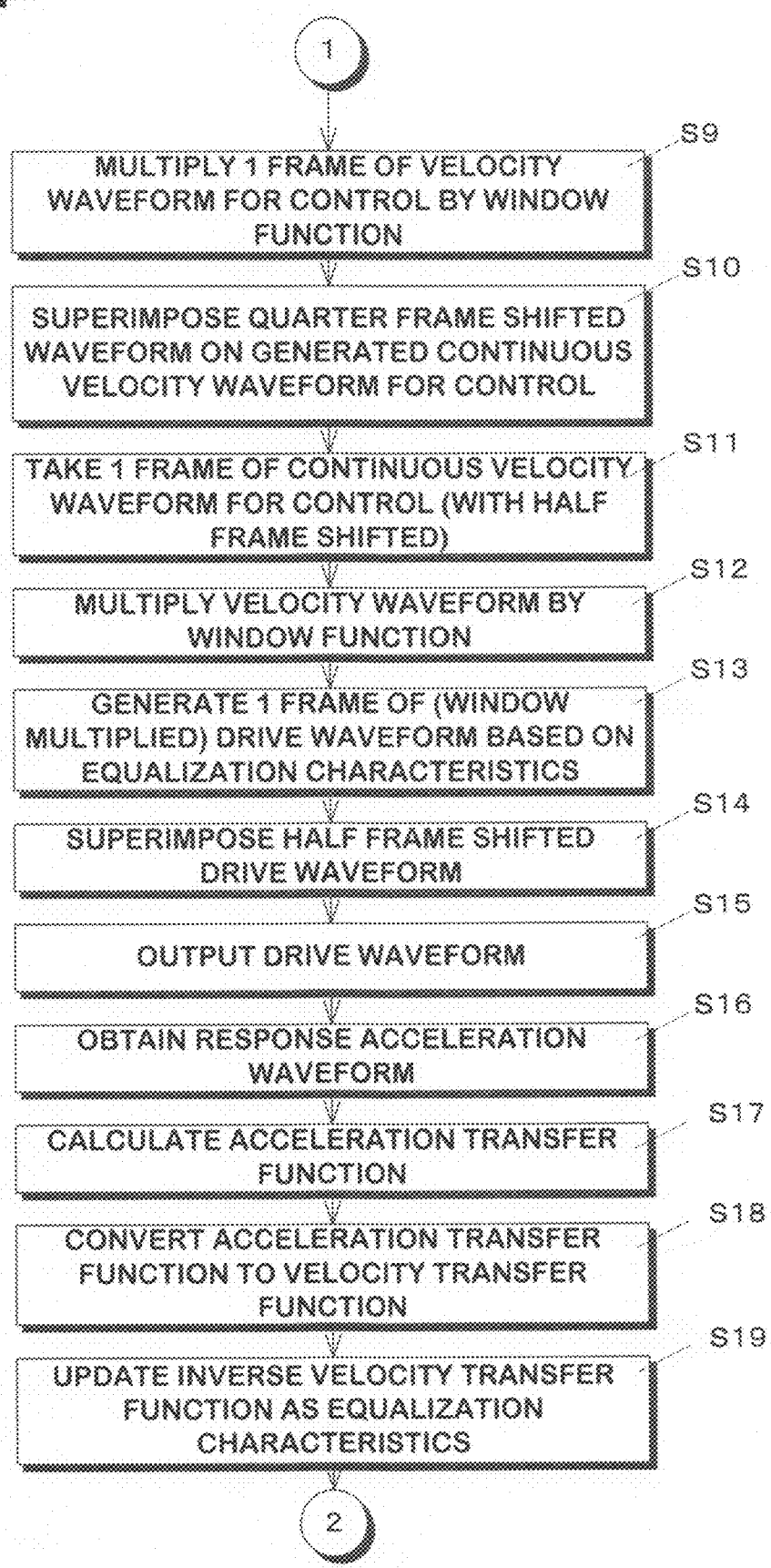
FIG. 4 is a flowchart of the vibration control program.

FIG. 3 and FIG. 4 each illustrate a flowchart of the control program 98. A description will hereinafter be made on control in the case where the test object 4 is applied with the vibration that has the reference acceleration PSD as illustrated in FIG. 5A and is limited such that any absolute value of velocity amplitude does not exceed a limit value. The limit values of the reference acceleration PSD and the velocity amplitude are input from the touchscreen display 94 or the like by a user and are recorded in the non-volatile memory 96.

The CPU 90 imports a response acceleration waveform from the acceleration sensor 6 for a prescribed period (hereinafter referred as one frame) via the A/D converter 10 (step S1). Furthermore, the CPU 90 performs the Fast Fourier Transform (FFT) on this response acceleration waveform to calculate response acceleration PSD (step S2). FIG. 5B illustrates an example of the calculated response acceleration PSD. In this embodiment, the response acceleration PSD of the response acceleration waveform for the single frame is calculated. However, the response acceleration PSD of the response acceleration waveform for prescribed frames in the past may be calculated.

Next, the CPU 90 compares the response acceleration PSD and the reference acceleration PSD and modifies acceleration PSD for control such that the response acceleration PSD matches the reference acceleration PSD (step S3). For example, it is assumed that the acceleration PSD for control at the time when the above response acceleration PSD is acquired is as illustrated in FIG. 5C. That is, it is assumed that, when the vibration generator 2 is operated with the vibration that is generated at least based on this acceleration PSD for control, the response acceleration PSD illustrated in FIG. 5B is acquired.

Some parts of the response acceleration PSD illustrated in FIG. 5B do not match the reference acceleration PSD. The CPU 90 compares magnitudes of unmatched parts per frequency component (referred to as a frequency line). Per frequency component, the acceleration PSD for control is increased when the response acceleration PSD is lower than the reference acceleration PSD, and the acceleration PSD for control (FIG. 5C) is reduced when the response acceleration PSD is higher than the reference acceleration PSD. The CPU 90 makes such modification and calculates the new acceleration PSD for control as illustrated in FIG. 5D.

Figure 6A:
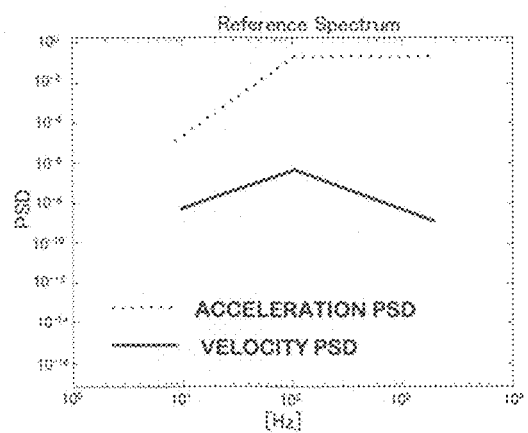
FIG. 6A illustrates velocity PSD for control and original acceleration PSD for control.

Next, the CPU 90 integrates the generated acceleration PSD for control, in other words, the CPU 90 converts the generated acceleration PSD for control into a velocity PSD for control of the different dimension (step S4). FIG. 6A illustrates a comparison between the velocity PSD for control, which is acquired by the conversion, and the original acceleration PSD for control. Despite the different dimensions, the velocity PSD for control and the original acceleration PSD for control are illustrated on the same graph screen for the comparison.

The CPU 90 determines an amplitude component of a velocity spectrum from this velocity PSD for control and performs the inverse Fast Fourier Transform (inverse FFT) by providing the uniform random phase to each of the components, so as to acquire a velocity waveform for control for the single frame (step S5). Due to provision of the uniformly distributed random phases, the generated velocity waveform for control has a Gaussian property.

Figure 6B:
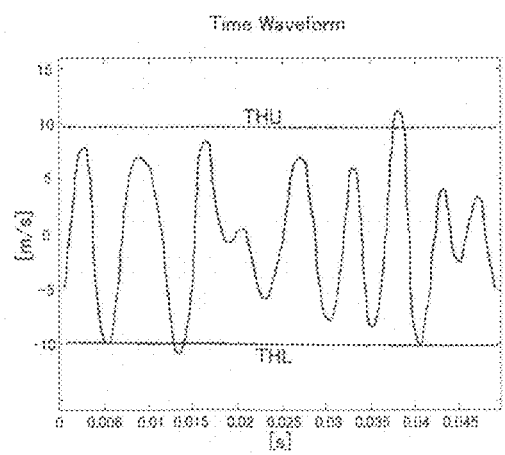
FIG. 6B illustrates a Gaussian random waveform of velocity for control and a forcibly clipped waveform.

Next, the CPU 90 clips this Gaussian random waveform of the velocity for control by the limit value (step S6). FIG. 6B illustrates the Gaussian random waveform of the velocity for control, which is generated in step S5, and the clipped waveform. In FIG. 6B, limit values THU and THL are illustrated. The clipped waveform, portions of which exceeding or falling below respective one of the limit values THU, THL are flattened, is obtained.

When such a velocity waveform is obtained by forcibly clipping the velocity waveform for control by the limit values, just as described, the following is considered. It is possible to prevent a voltage of the amplifier 80 at the time of vibrating the test object 4 from exceeding the limit value. However, in reality, a high-frequency component, which is not included in the original waveform and is located on the outside of a control band, is present in the clipped portion. For this reason, it is impossible to control the waveform while maintaining such a waveform. In addition, this waveform has the PSD that does not match the velocity PSD for control. Thus, when the velocity waveform for control, which is forcibly clipped, in FIG. 6B is used as is, the reference acceleration PSD illustrated in FIG. 5A cannot be achieved.

In view of the above, in this embodiment, this problem is solved as follows. The CPU 90 performs the Fast Fourier Transform of the clipped velocity waveform illustrated in FIG. 6B to calculate frequency characteristics of the phase (step S7). Next, the CPU 90 provides phase information of this clipped waveform to the amplitude spectrum, which is determined from the velocity PSD for control in FIG. 6A, performs the inverse Fast Fourier Transform (inverse FFT), so as to generate a non-Gaussian random waveform of the velocity for control for the single frame (step S8). This non-Gaussian random waveform of the velocity for control is set as the velocity waveform for control that is a reference waveform for waveform control. In this way, a peak value of the waveform is kept within a designated limit value while the velocity PSD for control is maintained.

Here, it may be determined whether the non-Gaussian random waveform of the velocity for control, which is generated as described above, exceeds the limit value. If the non-Gaussian random waveform of the velocity for control exceeds the limit value, the processing in steps S6 to S8 may be executed for the non-Gaussian random waveform of the velocity for control, and may repeatedly be executed until the non-Gaussian random waveform of the velocity for control does not exceed the limit value. In the case where the non-Gaussian random waveform of the velocity for control, which does not exceed the limit value, cannot be acquired even after the execution of the processing for prescribed times, the processing may return to step S5, and the Gaussian random waveform of velocity for control for the single frame may be generated again.

In step S6, in the case where the Gaussian random waveform of velocity for control for the single frame does not exceed the limit value and thus does not have to be clipped, this Gaussian random waveform of velocity for control may be used as is as the velocity waveform for control.

Figure 6C:
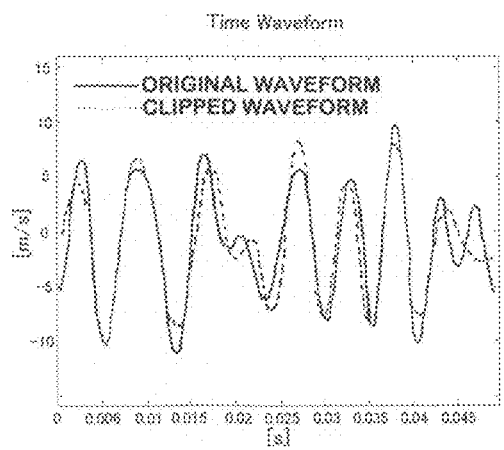
FIG. 6C is a graph illustrating the Gaussian random waveform of velocity for control and a softly clipped waveform.

FIG. 6C illustrates an example of the waveform in which all points in the single frame fall within the limit value while the velocity PSD for control, which is obtained through the above-described processing, is maintained. A mark of simple clipping is no longer present on this waveform, and the waveform is subjected to so-called soft clipping.

Figure 7A:
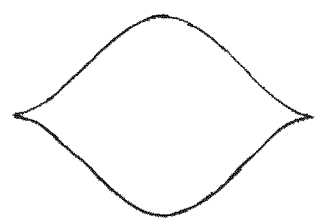
FIG. 7A illustrates an example of a window function.
Figure 7B:
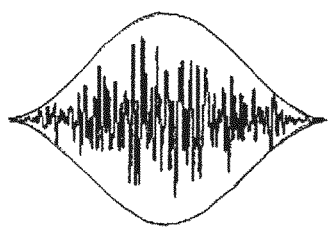
FIG. 7B to FIG. 7F are views for illustrating an overlap procedure of windowed waveforms.
Figure 7C:
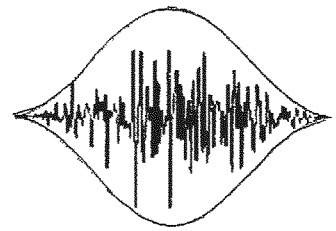
Figure 7D:
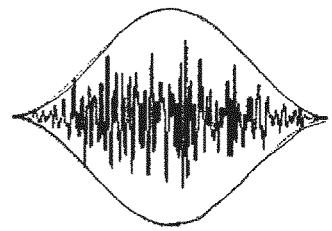
Figure 7E:
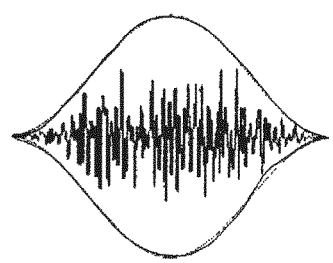

When the velocity waveform for control is acquired as described above, the CPU 90 multiplies the velocity waveform for control for a single frame by a window function (step S9). For example, as illustrated in FIG. 7A, such a function is used that has zero value at the initial time point and at the terminal time point of the single frame and has a maximum value at the central time point. Such a function is preferred that becomes unity as a total value at all the time points when each of the functions is shifted by certain width and superimposed on each other.

A property that should be provided to the window function used at this time is described in U.S. Pat. No. 5,012,428 (corresponding to Japanese Examined Patent Application Publication JP1994-5192B) mentioned before. In addition, processing for shifting waveform data of a wave packet, which is generated by the multiplication of the window function, by 1/M of the width of the frame and superimposing the shifted waveform data on each other is executed. In this case, a value of M has to satisfy a certain condition that is determined by the characteristics of the used window function (see U.S. Pat. No. 5,012,428). Just as described, a certain degree of freedom is available for selection of the window function and the numerical value M. However, usually, the Hanning window function is used, and the minimum value of M in this case is 4. In the present specification, the case of M=4 will be exemplified.

When the operation of shifting the velocity waveforms, each of which is multiplied by the window function, and superimposing the velocity waveforms on each other continues, the velocity waveform for control, in which the velocity waveforms for control (pseudo random waveforms) having a discrete spectrum per frame are consistently put together in a continuous manner, is generated. Since such waveform data does not have any definite period, the waveform is an irregular waveform (a true random waveform) and thus has a continuous spectrum. In addition, each windowed waveform is smoothly converged to zero at the initial time point and the terminal time point of the frame. Thus, there is no unnecessary frequency component at a connection point.

Figure 7F:
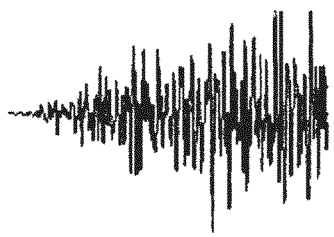

Just as described, the CPU 90 shifts the velocity waveforms for control, each of which is multiplied by the window function, by ¼ frame and superimposes the shifted velocity waveforms for control on each other (step S10). Thus, when the processing in steps S1 to S10 is repeated, as illustrated in FIGS. 7B to 7E, the windowed waveforms, each of which is shifted by ¼ frame, are superimposed on each other. As a result, the continuous velocity waveform for control as illustrated in FIG. 7F can be acquired.

Here, it may be examined whether one frame of the continuous velocity waveform for control contains a point that exceeds the limit value. If a single point in the frame of the continuous velocity waveform for control exceeds the limit value, the velocity waveform for control may be recalculated again.

Next, the CPU 90 takes out the single frame from the continuous velocity waveform for control (step S11). However, in the real-time drive signal generation process, which is executed per frame, the frames possibly become non-continuous if they are directly connected. To handle such a problem, the following overlapping processing is executed (steps S12, S13, S14). The waveform data is taken out by shifting the initial point by ½ frame. Then, the waveform data is multiplied by the Hanning window to generate the waveform for equalization. Thereafter, a convolution operation is performed on the thus-generated waveform by using an impulse response as the equalization processing to generate a drive signal waveform. The drive signal waveforms are sequentially shifted by ½ frame, superimposed on each other, and connected to each other.

The CPU 90 performs the convolution operation on the single frame of velocity waveform for control, which is taken out, by using the impulse response as the equalization characteristics, so as to generate the drive signal (step S13). In this embodiment, as the equalization characteristics, an inverse of the transfer function of a system including the vibration generator 2 and the test object 4 is used. That is, in order to vibrate the test object 4 with the velocity waveform for control, the convolution operation is performed on the velocity waveform for control by using the impulse response, which corresponds to the inverse characteristics of the transfer function, so as to generate the waveform as the drive waveform. In this way, the test object 4 can be vibrated with the velocity waveform for control. However, the transfer function may be used as the equalization characteristics.

While executing the overlapping processing for shifting the velocity waveforms for control, each of which is multiplied by the window function, by ½ frame and superimposing the velocity waveforms for control, the CPU 90 connects the thus-generated drive signals (steps S12, S14). In this way, the CPU 90 generates the continuous drive waveform and outputs this drive waveform to the amplifier 80 via the D/A converter 70 (step S15).

As a result, the vibration generator 2 is provided with the drive signal that is amplified by the amplifier 80, and thus can vibrate the test object 4. At this time, such processing is executed to prevent the velocity waveform for control from exceeding the limit value, the voltage of the amplifier 80 does not exceed an allowed maximum voltage.

Next, the CPU 90 acquires the response acceleration waveform from the acceleration sensor 6 (step S16). Then, the CPU 90 calculates an acceleration transfer function of the system at least based on the acquired drive waveform and the response acceleration waveform (step S17). That is, the response acceleration signal is subjected to the FFT to calculate a response acceleration spectrum (including phase information), and the drive waveform is subjected to the FFT to calculate a drive spectrum (including phase information). As a ratio between the acceleration spectrum and the drive spectrum, the acceleration transfer function is calculated from both of the response acceleration spectrum and the drive spectrum.

Next, this acceleration transfer function is integrated and is converted into a velocity transfer function (step S18). That is, the acceleration transfer function is converted into the velocity transfer function as a ratio between the velocity spectrum and the drive spectrum. A reciprocal of the velocity transfer function is calculated, and is updated as the equalization characteristics (step S19). This equalization characteristics is used when the drive signal is generated next time.

Meanwhile, a value that is obtained by dividing the squared response acceleration spectrum by the frequency resolution Δf is averaged to have prescribed statistical degree of freedom (DOF) defined by a random vibration test condition, so as to calculate the response acceleration PSD (step S2). Then, this response acceleration PSD is compared to the reference acceleration PSD, and acceleration PSD data for control is modified such that an error therebetween approaches zero (step S3).

The CPU 90 repeatedly executes the processing that has been described so far. In this way, the test object 4 can be applied with the vibration that is the Gaussian acceleration vibration having the desired acceleration PSD and in which the corresponding velocity waveform has the non-Gaussian property.

Figure 8A:
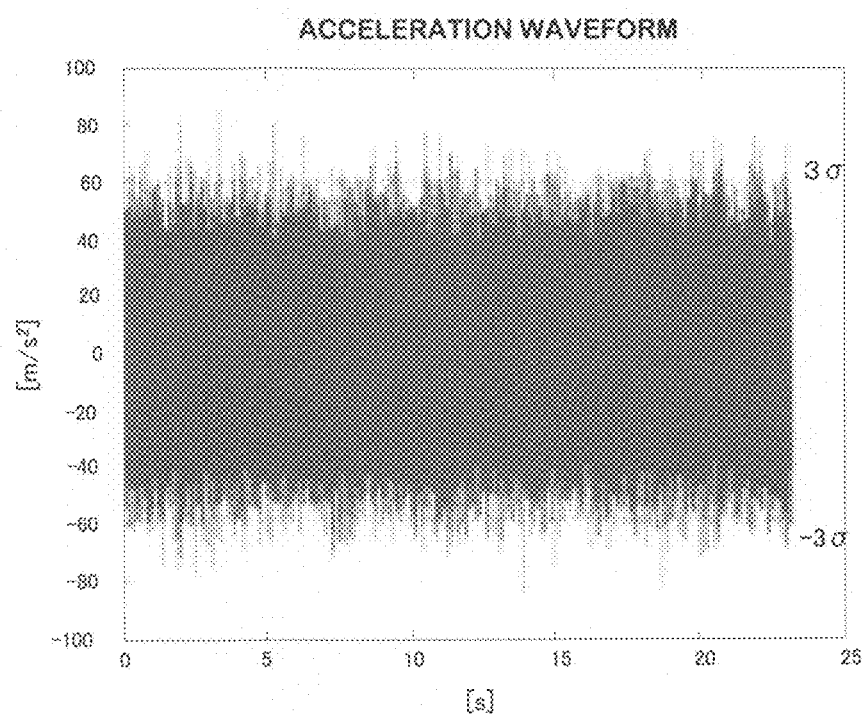
FIG. 8A illustrates an example of a reference acceleration waveform.

The operations, which have been described so far, are sequentially applied. As a result, a non-Gaussian random vibration controller is formed. FIGS. 8A to H illustrate an example in which a new functionality provided to the conventional random vibration controller by the technique of the present invention is briefly illustrated. The example illustrates data in the case where all the data of the velocity waveform, which is determined from reference velocity PSD, is measured by using a standard deviation σ (matches an RMS value due to lack of DC component), and a peak thereof is limited in a manner not to exceed a value corresponding to ±2.7σ. FIG. 8A illustrates a reference acceleration waveform that is generated at least based on the data on the reference acceleration PSD in FIG. 6A by performing the above-described operation. A level corresponding to +3σ and a level corresponding to −3σ are indicated by dotted lines. Since the acceleration signal is distributed to regions outside these levels. Thus, it is considered that this signal has the Gaussian property.

Figure 8B:
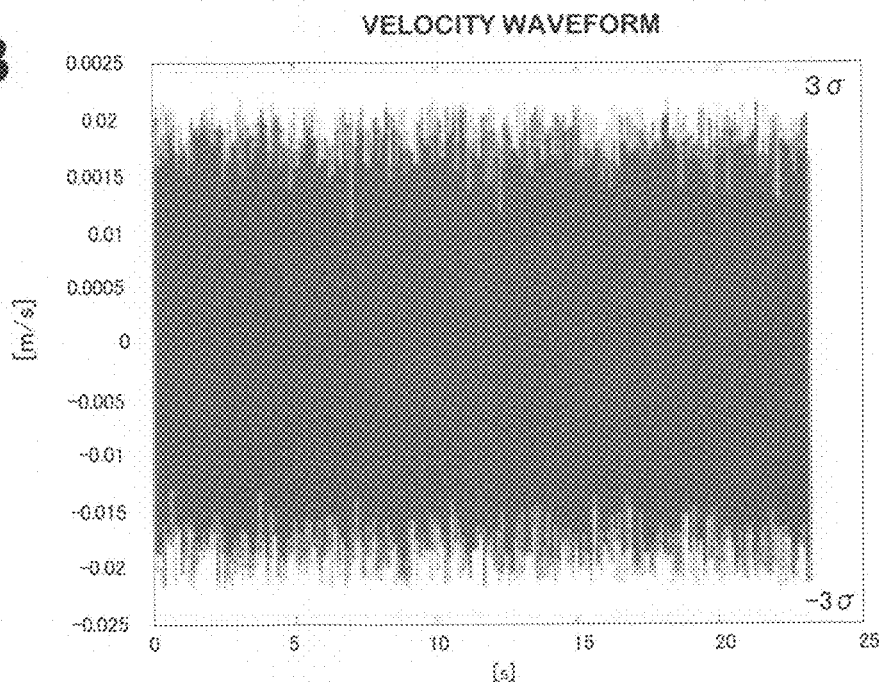
FIG. 8B illustrates an example of a reference velocity waveform, a peak of which is limited.

Meanwhile, FIG. 8B illustrates the velocity waveform, a peak of which is limited by a level corresponding to ±2.7σ of the velocity generated by the above-described operation. It is found that the entire velocity waveform data are distributed in the region in the inside of the dotted lines indicative of the levels of ±3σ, more specifically, within the level corresponding to ±2.7σ. This signal has a non-Gaussian property.

Figure 8C:
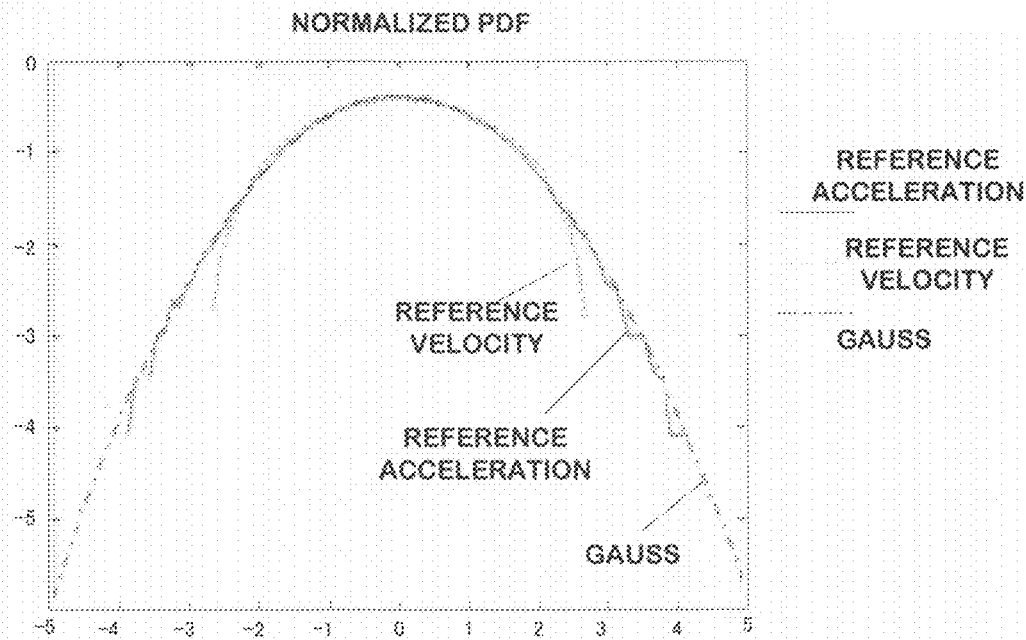
FIG. 8C illustrates an example of an amplitude probability density function (PDF), for which the reference acceleration waveform and the reference velocity waveform are subjected to a histogram analysis, and a theoretical PDF of Gaussian distribution.

FIG. 8C is a graph in which the reference acceleration waveform and the reference velocity waveform described above are each subjected to a histogram analysis to calculate an amplitude probability density function (PDF) and is plotted with theoretical PDF of the Gaussian distribution. It is clearly indicated that, while the PDF of the reference acceleration waveform substantially matches the PDF of the Gaussian distribution, the PDF of the reference velocity waveform deviates from the PDF of the Gaussian distribution. In particular, absence of any data point in the outside of ±2.7σ clearly indicates that the velocity peak value can be limited as the purpose of the present invention.

Figure 8D:
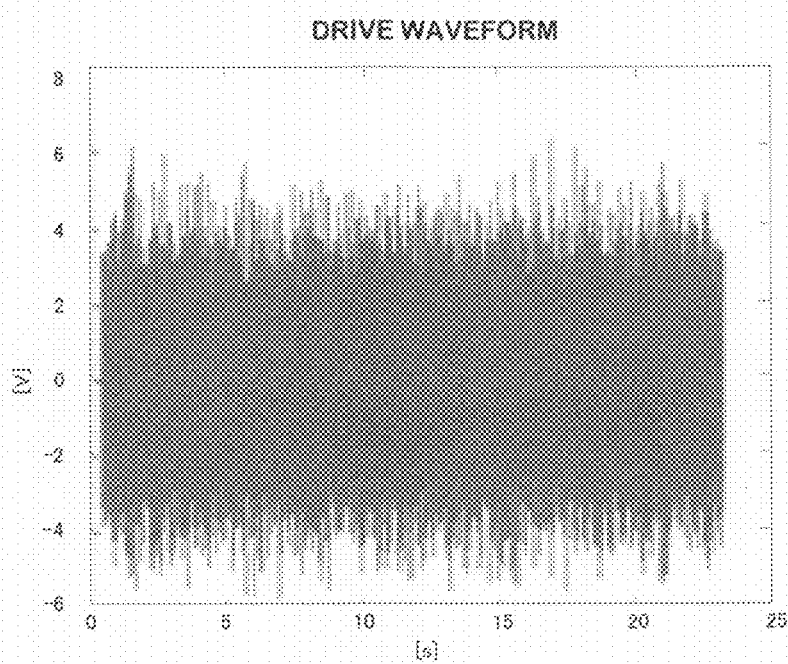
FIG. 8D illustrates an example of a drive waveform.
Figure 8E:
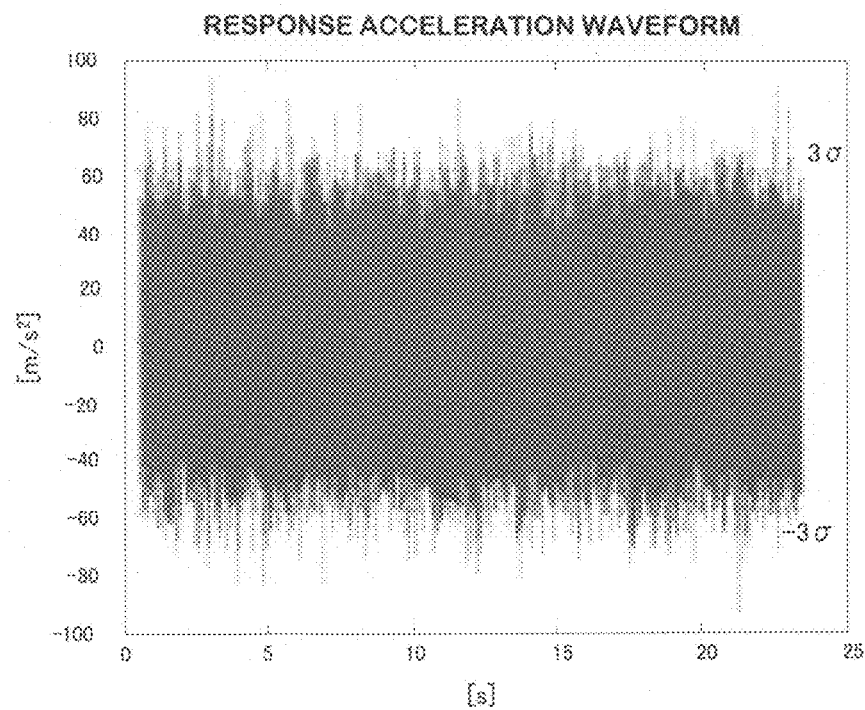
FIG. 8E illustrates an example of a response acceleration waveform.

In the non-Gaussian random controller of the present invention, equalization processing is executed for the reference velocity waveform by the above-described method for the waveform control such that this reference velocity waveform is not changed as a waveform, and the drive waveform is thereby generated. FIG. 8D illustrates an example of the data on the drive waveform. This drive waveform is output to the amplifier 80, the amplifier drives the vibration generator 2, and resultant of the drive waveform is detected as the response acceleration waveform by the acceleration sensor that is placed on a control point 6 on vibration table 4. FIG. 8E illustrates an example of the response acceleration waveform. It is found that, since this signal is distributed in the region in the outside of the level of ±3σ, this signal has the Gaussian property.

Figure 8F:
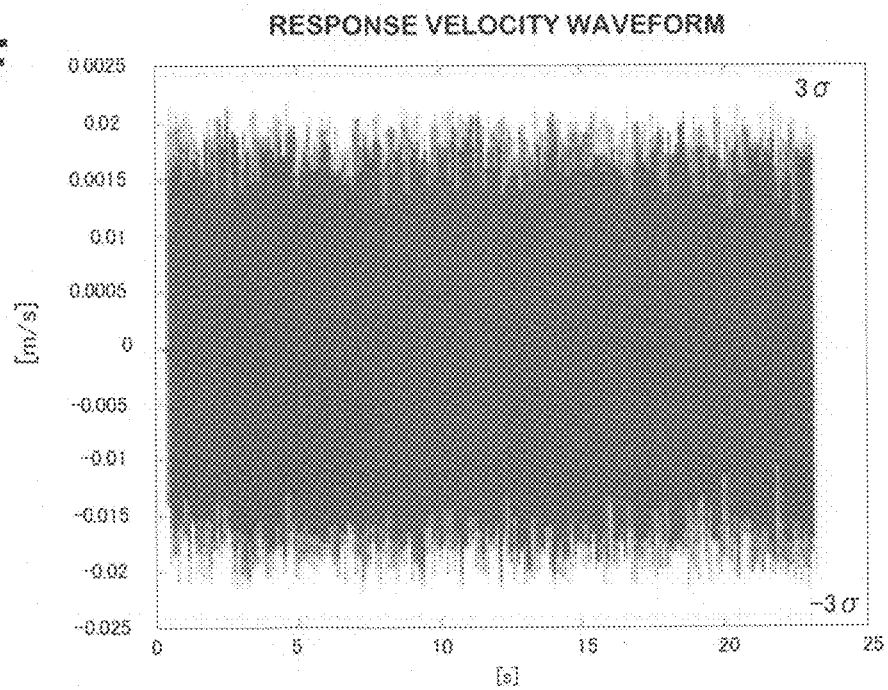
FIG. 8F illustrates an example of a response velocity waveform.

Meanwhile, FIG. 8F illustrates response velocity waveform data. The response velocity waveform data is calculated by using a differential equation system that describes a dynamic process in which the drive waveform, which is generated by equalizing the reference velocity waveform by the method for the waveform control, passes through a controlled system, and by integrating the differential equation. (The response acceleration waveform data in FIG. 8E is also calculated in this way). As illustrated in this drawing, it is found that the waveform control is executed as desired and the entire response velocity waveform data is distributed in the region in the inside of the dotted lines indicative of the levels of ±3σ, more specifically, within the level corresponding to ±2.7σ. This signal has a non-Gaussian property.

Figure 8G:
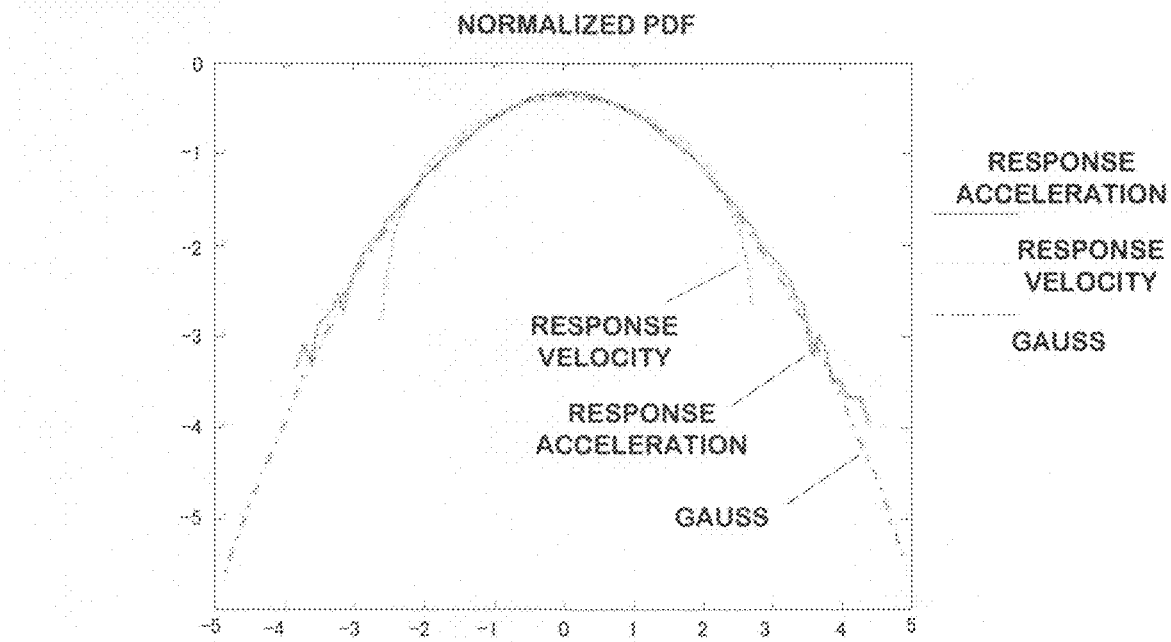
FIG. 8G illustrates an example of a PDF as a result of the histogram analysis of the response acceleration waveform and the response velocity waveform.

FIG. 8G is a graph in which the PDFs as a result of the histogram analysis of these response acceleration waveform and response velocity waveform are plotted together. It is clearly indicated that, while the PDF of the response acceleration waveform substantially matches the PDF of the Gaussian distribution, the PDF of the response velocity waveform deviates from the PDF of the Gaussian distribution. In particular, the absence of the data point in the outside of ±2.7σ clearly indicates that the waveform control is executed as desired and the velocity peak value can be limited as the purpose of the present invention.

Figure 8H:
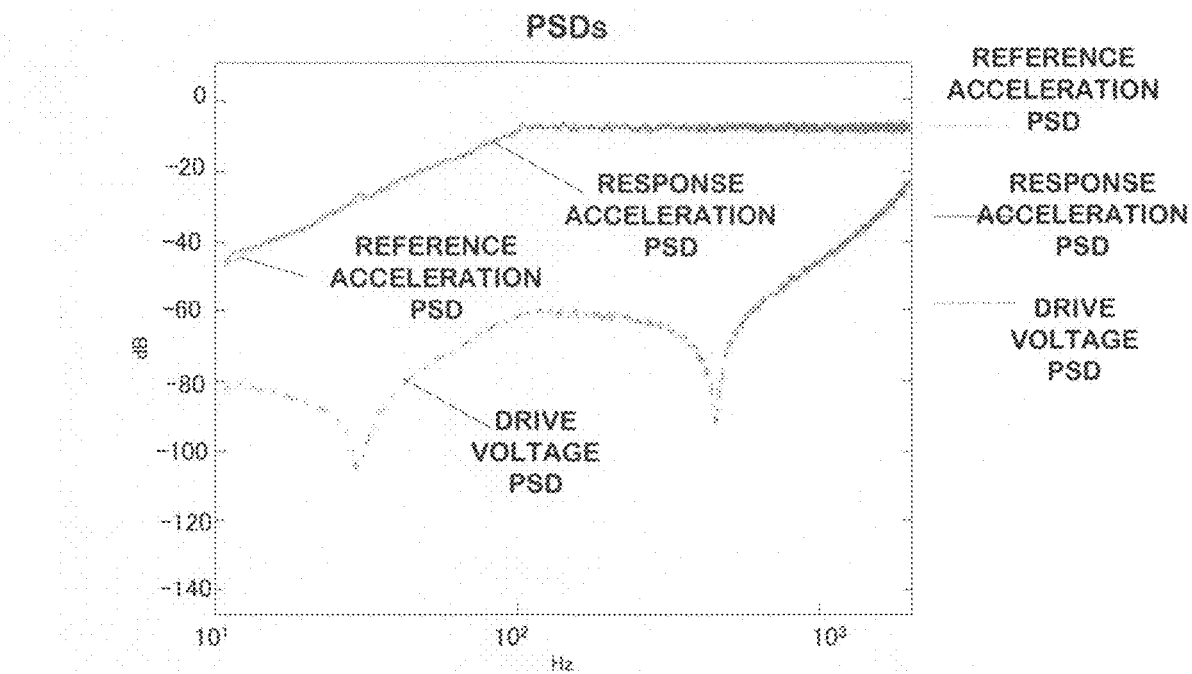
FIG. 8H illustrates an example of the response acceleration PSD (a solid line), the reference acceleration PSD (a dotted line), and drive voltage PSD (a one-dot chain line).

Finally, FIG. 8H is a graph in which the response acceleration PSD (a solid line) is plotted with the drive voltage PSD (a one-dot chain line). The drive voltage PSD is controlled to have such characteristics that equalizes the characteristics of the controlled system. In this way, the response acceleration waveform keeps the Gaussian property, and the PSD thereof matches the reference acceleration PSD (the dotted line) well. Meanwhile, as illustrated in FIGS. 8F, 8G, the response velocity waveform is reproduced as a random signal that has a non-Gaussian property and, all the data points of which fall within a region between the specified limit values.

In regard to a waveform such as a sine wave, a property of which as the waveform is defined deterministically, regardless of whether the property is defined by velocity or acceleration, the same physical phenomenon (vibration) is observed as a kinematic quantity of different dimension. Thus, it is needless to say that the vibration as an actual entity is the same. However, the random vibration that is handled herein is not a deterministic signal but an irregular signal, the waveform of which changes over time, and in which the exactly same waveform never appears again. Thus, the random vibration has a probabilistic property. In the random vibration test, the vibration to be reproduced is defined by assuming presence of a stationary stochastic process for providing the actual vibration environment and designating the actual vibration by the reference acceleration PSD. That is, only an acceleration amplitude spectrum (and the Gaussian property of the acceleration waveform) is defined. Thus, it can be said that the random vibration has a vast amount of degree of freedom in the phase quantity. What the present inventors have achieved in the present invention is to generate such a vibration that has the Gaussian property as the acceleration waveform but has a non-Gaussian property as the velocity waveform by using the significant degree of freedom in the phase. As a non-Gaussian property, the peak value exceeding 2.7σ never appears, for example. Such a matter can be achieved in the world of the irregular waveform.

1.4 Other (1) In the above embodiment, as illustrated in FIG. 1, the means 30 for calculating corresponding physical quantity PSD for control includes the control physical quantity PSD calculation means 32 and the PSD conversion means 34. That is, the physical quantity PSD for control is calculated from the response physical quantity PSD and the reference physical quantity PSD, and the corresponding physical quantity PSD for control is acquired at least based on the physical quantity PSD for control.

Figure 9:
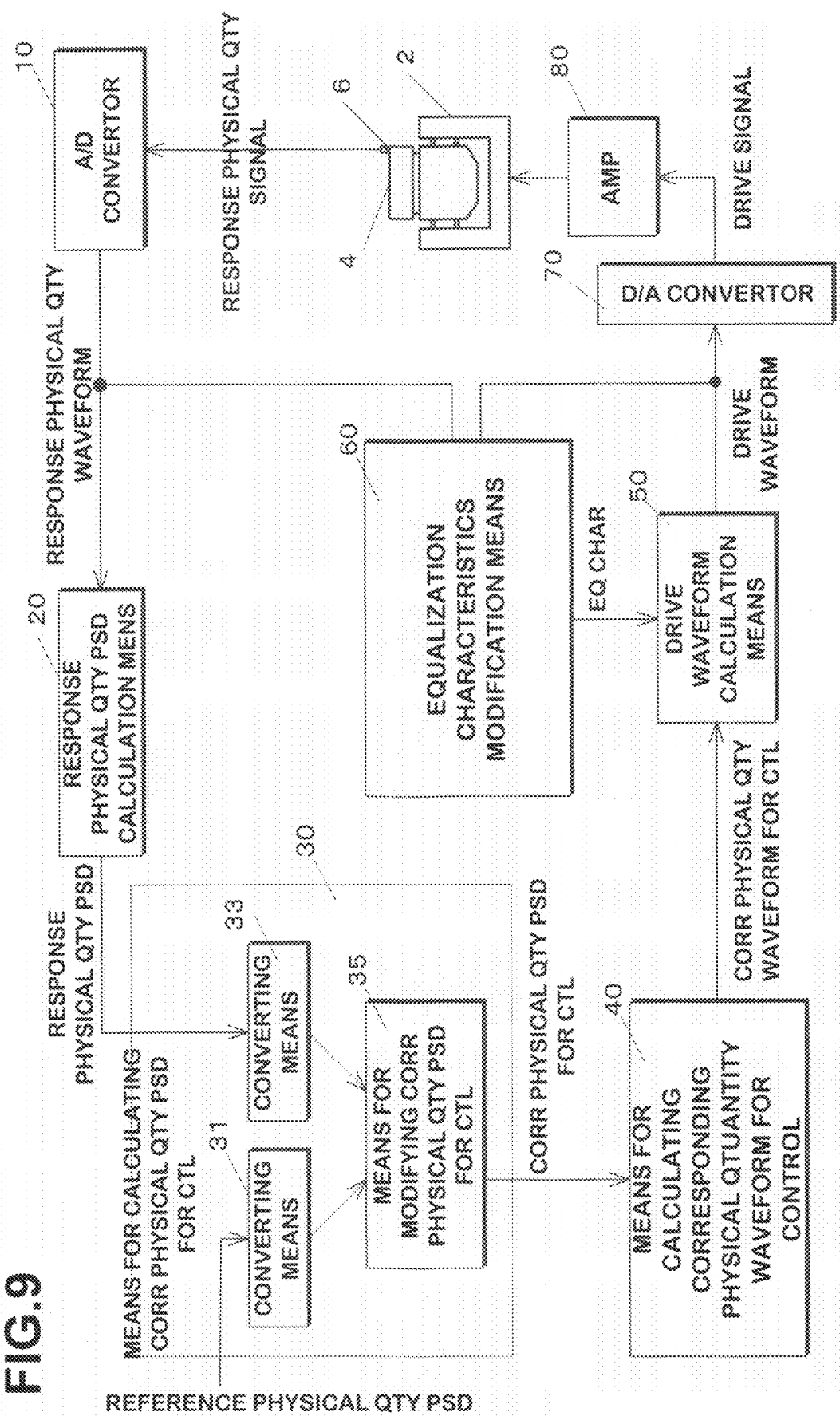
FIG. 9 is a view illustrating another example of corresponding physical quantity PSD for control calculation means 30.

However, as illustrated in FIG. 9, the means 30 for calculating corresponding physical quantity PSD for control may include conversion means 31, conversion means 33, and means 35 for modifying corresponding physical quantity PSD for control. The conversion means 31 converts the reference physical quantity PSD into reference corresponding physical quantity PSD. The conversion means 33 converts the response physical quantity PSD into response corresponding physical quantity PSD.

The means 35 for modifying corresponding physical quantity PSD for control calculates the corresponding physical quantity PSD for control such that the response corresponding physical quantity PSD is equal to the reference corresponding physical quantity PSD.

(2) In the above embodiment, as illustrated in FIG. 1, the drive waveform is calculated at least based on the corresponding physical quantity waveform for control and in consideration of the equalization characteristics.

Figure 10:
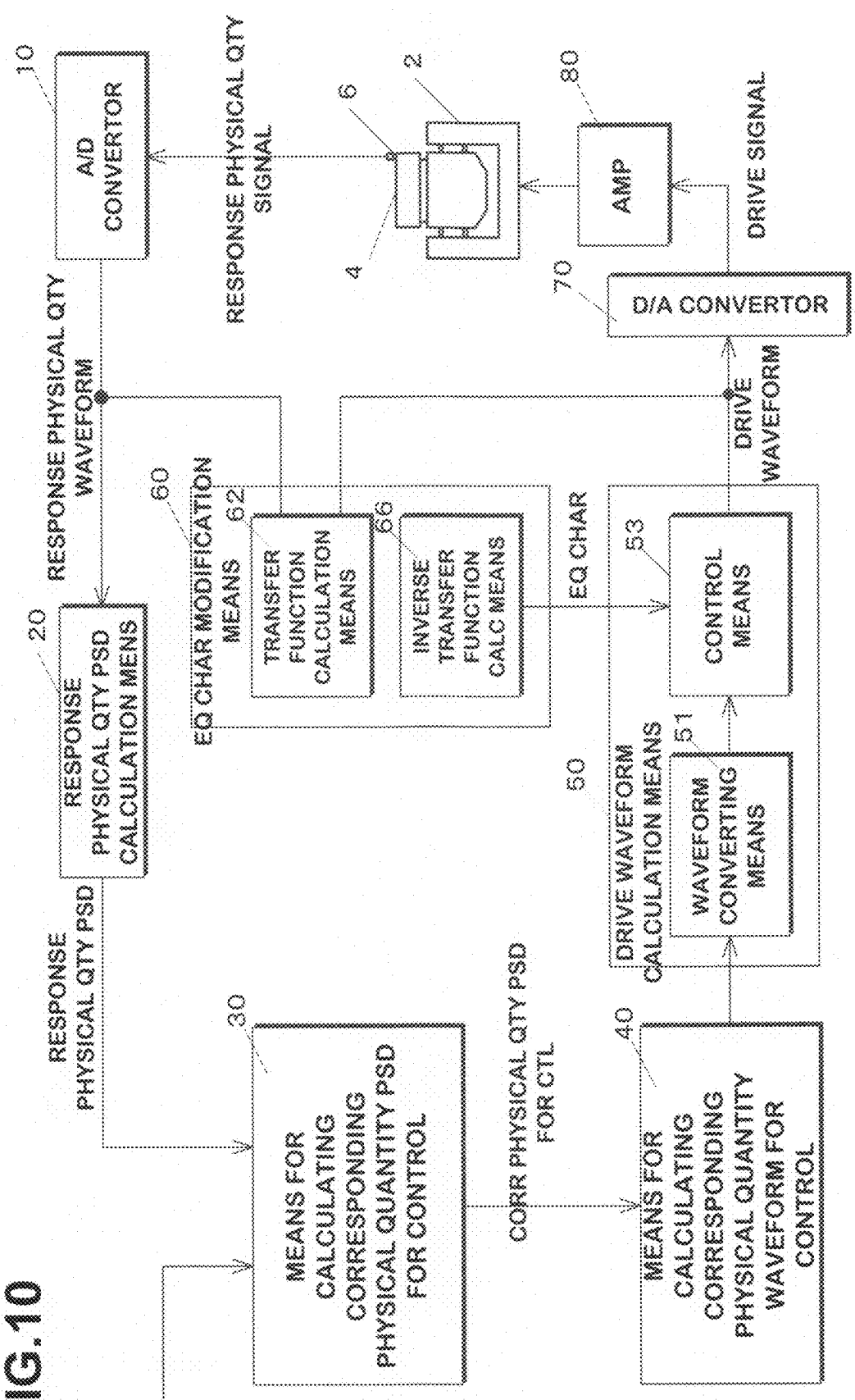
FIG. 10 is a view illustrating another example of drive waveform calculation means 50 and equalization characteristics modification means 60.

However, as illustrated in FIG. 10, waveform conversion means 51 may differentiate (integrate) the corresponding physical quantity waveform for control and converts the corresponding physical quantity waveform for control into a physical quantity waveform for control. For example, an acceleration waveform for control can be acquired by differentiating the velocity waveform for control.

In the control means 53, the drive waveform can be obtained at least based on the physical quantity waveform for control, which is obtained by the conversion just as described, and in consideration of the equalization characteristics.

As the equalization characteristics in this case, a reciprocal of a response physical quantity transfer function, which is obtained at least based on the drive waveform and a response physical quantity waveform, is used. Thus, as illustrated in FIG. 10, the equalization characteristics modification means 60 includes the transfer function calculation means 62 and the inverse transfer function calculation means 66.

(3) In the above embodiment, as illustrated in FIG. 1, the means 40 for calculating corresponding physical quantity waveform for control includes the means 42 for calculating Gaussian corresponding physical quantity waveform for control, the non-Gaussian conversion means 44, the phase extraction means 46, and the waveform calculation means 48. That is, the phase information of the non-Gaussian corresponding physical quantity waveform for control is extracted, and the corresponding physical quantity waveform for control is calculated at least based on the corresponding physical quantity PSD for control and the phase information thereof. In this way, the non-Gaussian corresponding physical quantity waveform for control can be acquired while corresponding physical quantity PSD for control is maintained (that is, the reference physical quantity PSD is maintained).

Figure 11:
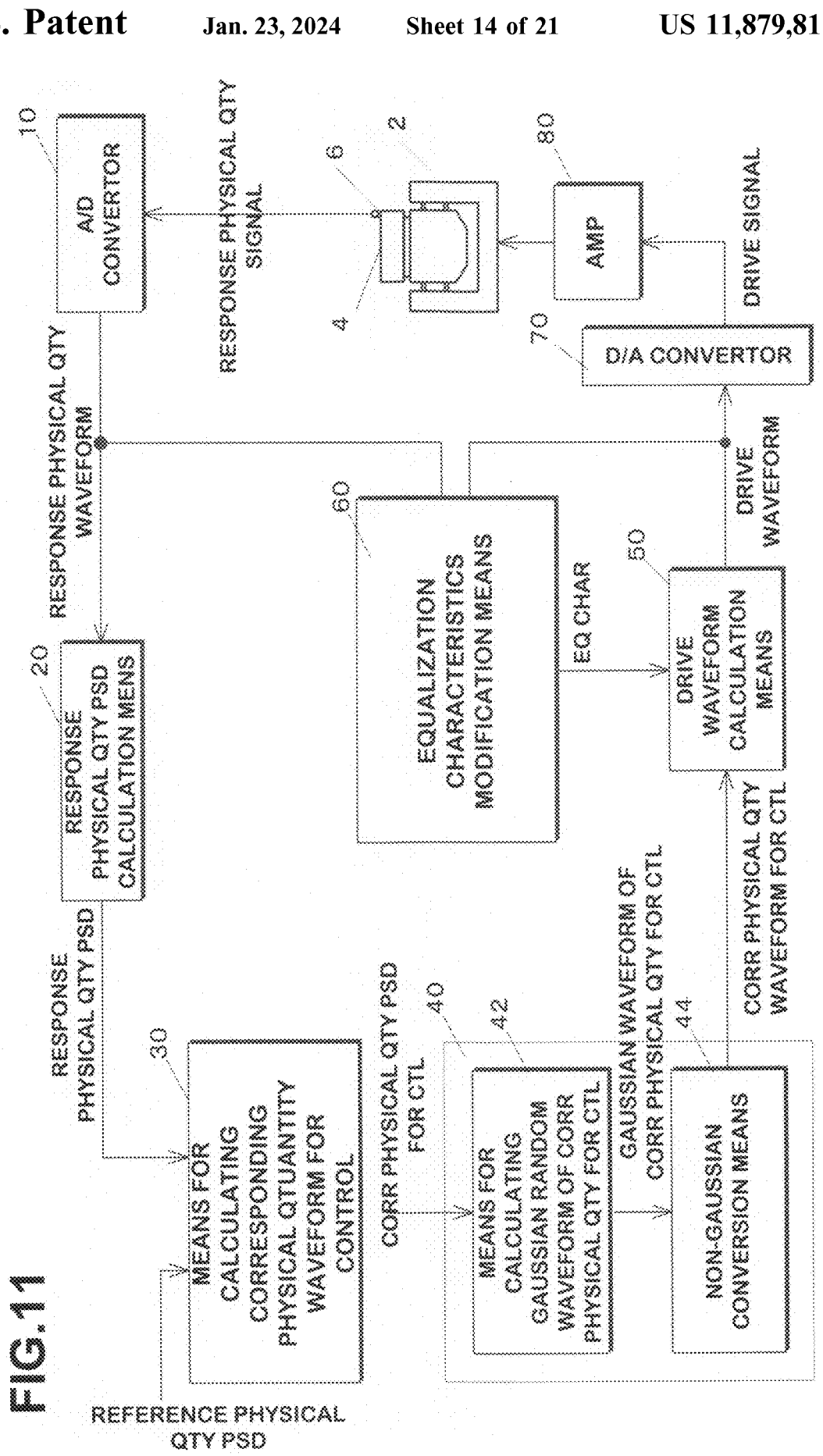
FIG. 11 is a view illustrating another example of corresponding physical quantity waveform for control calculation means 40.

However, in the case where the reference physical quantity PSD does not have to be maintained directly and accurately, as illustrated in FIG. 11, PSD control may be executed with the corresponding physical quantity PSD for control being a direct control target, and the non-Gaussian random waveform of the corresponding physical quantity for control, which is converted by the non-Gaussian conversion means 44, may be used as is as the corresponding physical quantity waveform for control.

(4) In the above embodiment, as illustrated in FIG. 1, the equalization characteristics modification means 60 includes the transfer function calculation means 62, the transfer function conversion means 64, and the inverse transfer function calculation means 66.

Figure 16:
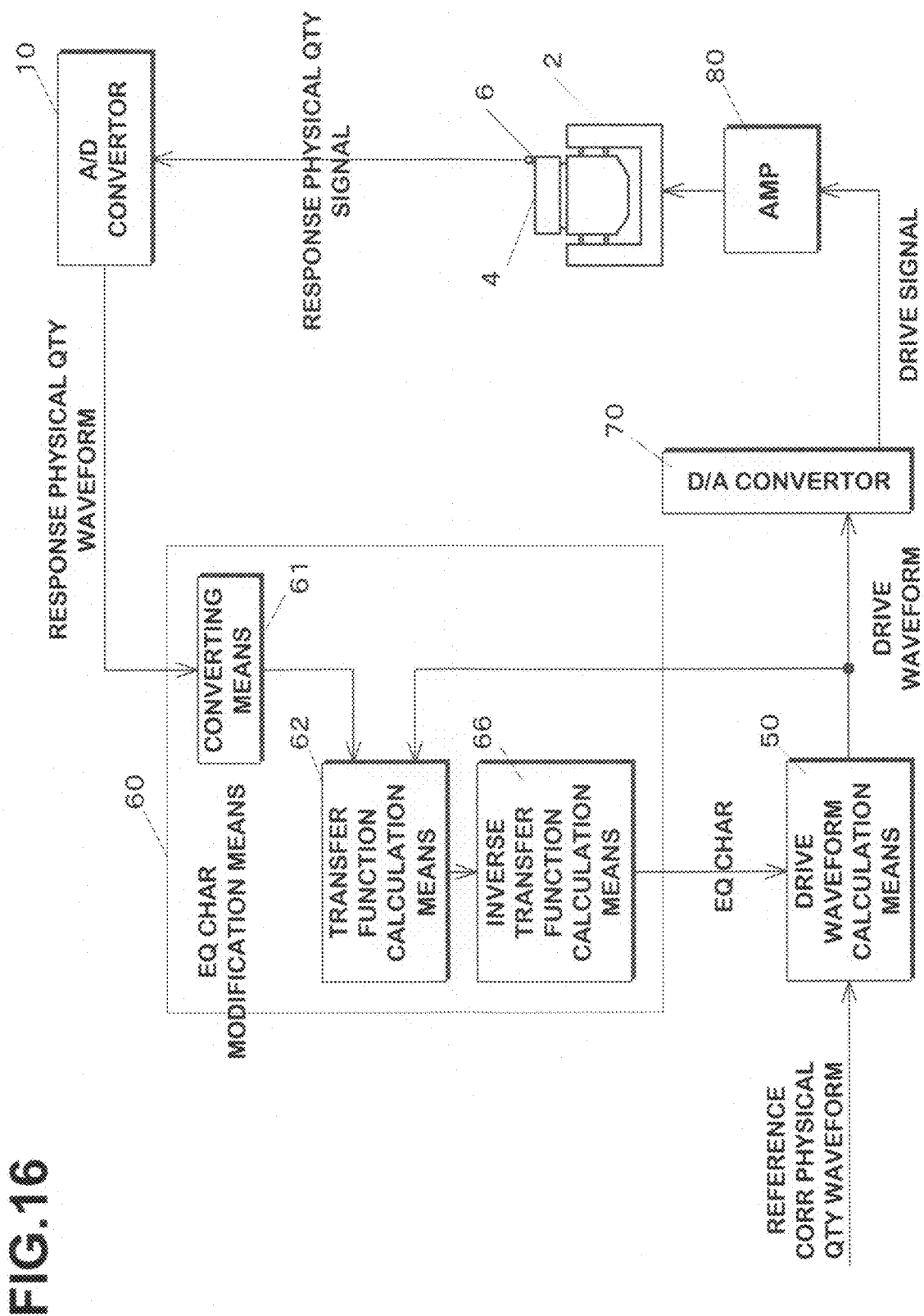
FIG. 16 is a view illustrating another example of equalization characteristics modification means 60.

However, as illustrated in FIG. 16, the equalization characteristics modification means 60 may include conversion means 61, the transfer function calculation means 62, and the inverse transfer function calculation means 66. The conversion means 61 converts the response physical quantity waveform into response corresponding physical quantity waveform. The transfer function calculation means 62 calculates a corresponding physical quantity transfer function at least based on the drive waveform and the response corresponding physical quantity waveform. The inverse transfer function calculation means 66 calculates a reciprocal of the corresponding physical quantity transfer function as the equalization characteristics.

Figure 12:
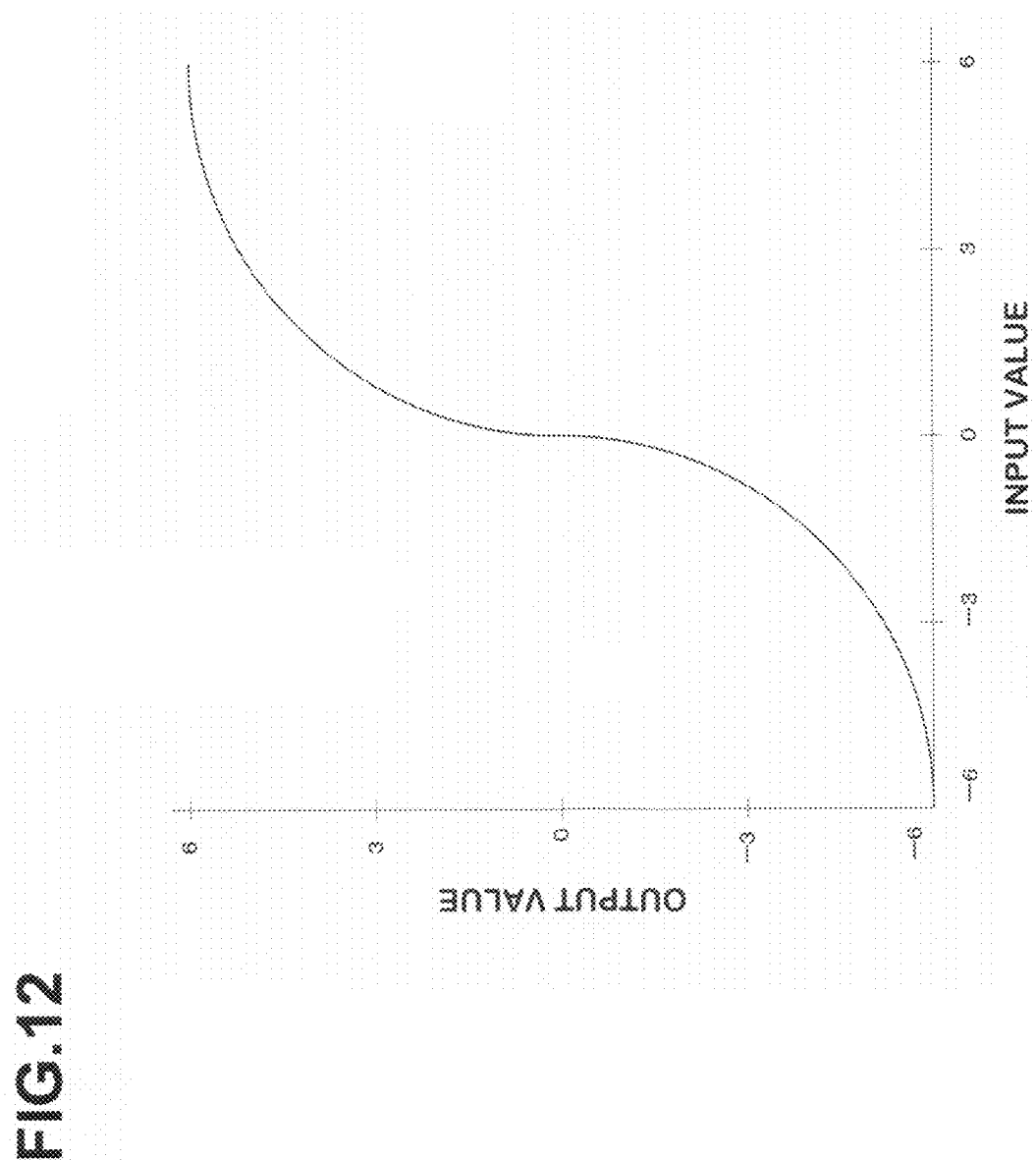
FIG. 12 illustrates an example of a ZMNL function.

(5) In the above embodiment, as an example of generating a non-Gaussian property by the non-Gaussian conversion means 44, the description has been made on the case of clipping. However, the amplitude of a Gaussian random waveform of the corresponding physical quantity for control may be converted by using a ZMNL function as exemplified in FIG. 12 to calculate a non-Gaussian random waveform.

Alternatively, some desired non-Gaussian characteristics (such as Kurtosis or Skewness) may be applied to generate a non-Gaussian random waveform having the desired non-Gaussian characteristics.

(6) In the above embodiment, the description has been made on the case where the velocity waveform for control achieves a non-Gaussian property (clipped or the like). However, the above embodiment can be applied similarly to a case where a displacement waveform for control achieves the similar non-Gaussian property (clipped or the like).

For example, it is possible to conduct such a vibration test in which a maximum value of the displacement waveform for control is limited by clipping to prevent the vibration generator 2 from exceeding an allowed maximum displacement thereof. Here, in step S4, the acceleration PSD for control may be integrated twice to obtain displacement PSD for control. Then, at least based on this displacement PSD for control, the displacement waveform for control can be obtained.

Similarly, jerk PSD for control can be obtained by differentiating the acceleration PSD for control. Then, at least based on this jerk PSD for control, a jerk waveform for control can be obtained. Accordingly, it is possible to execute such control that clips the jerk waveform.

Furthermore, in the above description, the response acceleration waveform is acquired as the response physical quantity. However, a response waveform of another dimension such as the response velocity waveform, a response displacement waveform, or a response jerk waveform.

(7) In the above embodiment, the description has been made on the case where the reference acceleration PSD is provided as the reference PSD. However, the above embodiment can be applied similarly to a case where the physical quantity of the other dimension is provided as the reference PSD.

(8) In the above embodiment, in step S10 and step S11, the velocity waveforms for control are respectively shifted by ¼ frame or ½ frame and are superimposed on each other. However, the velocity waveforms for control may be shifted by 1/M frame and be superimposed on each other.

(9) In the above embodiment, the drive waveform is calculated at least based on the velocity waveform for control, the velocity transfer function (the ratio between the spectrum of the drive waveform and the spectrum of the response velocity waveform) is calculated at least based on the response acceleration waveform and the drive waveform, and the reciprocal thereof is set as the equalization characteristics.

The selection of the transfer function depends on the dimension, the physical quantity of which is detected as the response physical quantity waveform, and the dimension, the physical quantity of which is used as the corresponding physical quantity waveform for control.

For example, in the case where the drive waveform is calculated at least based on the displacement waveform for control and the response acceleration waveform is acquired by the sensor 6, a displacement transfer function (a ratio of the spectrum of the response displacement waveform to the spectrum of the drive waveform) may be calculated at least based on the response acceleration waveform and the drive waveform, and the reciprocal thereof may be set as the equalization characteristics. The response acceleration PSD may be integrated twice to be converted into response displacement PSD (however, it should be considered that the PSD is a quantity of the square of the amplitude spectrum).

Figure 13:
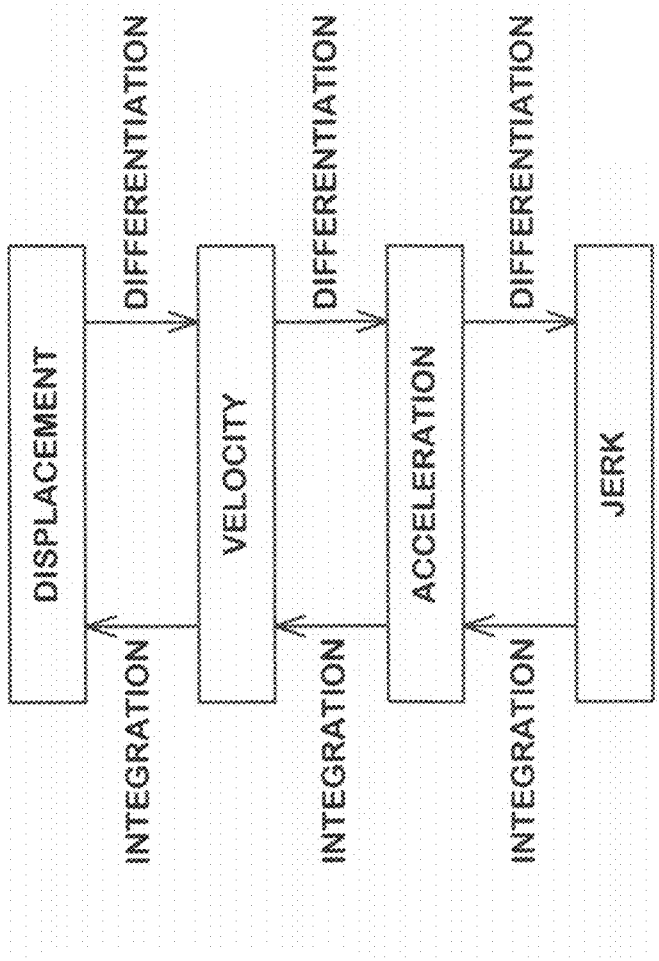
FIG. 13 is a view illustrating a relationship between two each of dimensions of a physical quantity describing motion.

As illustrated in FIG. 13, the "displacement", the "velocity", the "acceleration", and the "jerk" of the same vibration can be converted to one of the others by integration or differentiation. Accordingly, even in the case where the dimensions of the response physical quantity, which is detected by the sensor 6, and the corresponding physical quantity for control differ from each other, it is possible to calculate the appropriate equalization characteristics by the conversion.

(10) In the above embodiment, the description has been made on the vibration control system for the excitation in one direction by the vibration generator 2. However, the above embodiment can be applied similarly to a multi-axis vibration control system for excitation in a plurality of directions.

(11) In the above embodiment, the corresponding physical quantity PSD for control, the dimension of which differs from that of the reference physical quantity PSD, is generated for the control. However, the physical quantity PSD for control, the dimension of which is the same as that of the reference physical quantity PSD, may be generated for the control. In this case, the PSD conversion means 34 is unnecessary.

(12) Each of the above modified examples can be combined with the other(s) of the modified examples or can be applied to another embodiment unless contrary to the nature thereof.

2. Second Embodiment

2.1 Functional Configuration

Figure 14:
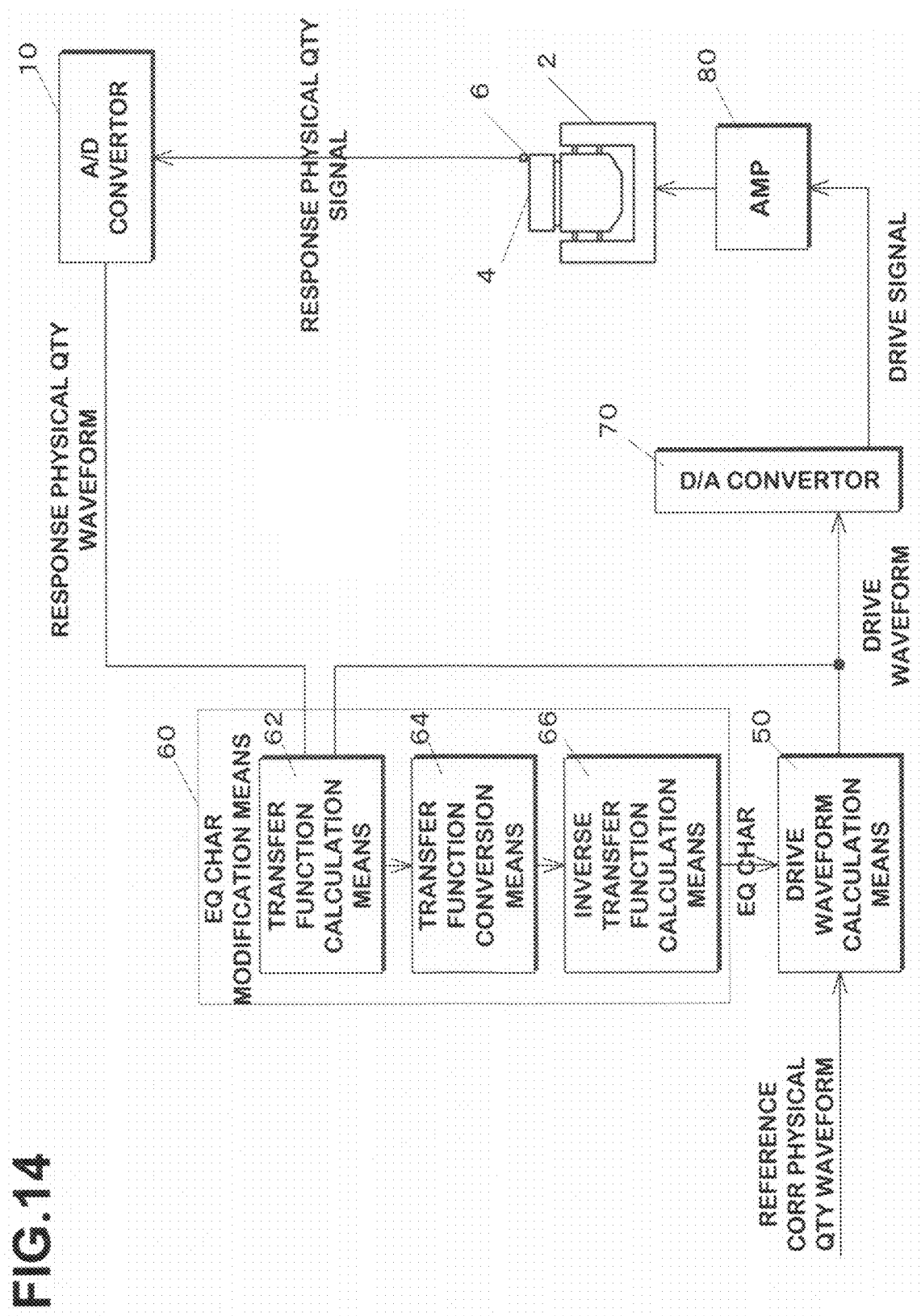
FIG. 14 is a functional block diagram of a vibration control system according to a second embodiment.

FIG. 14 is a functional block diagram of a vibration control system according to another embodiment of the present invention. In this embodiment, control is executed such that the test object 4 vibrates in a manner that the waveform thereof matches a provided reference waveform. However, the dimension of the reference physical quantity is different from that of the response quantity that is detected by the sensor 6 attached to the test object 4. That is, the dimension of the reference corresponding physical quantity waveform differs from that of the response physical quantity waveform.

The drive waveform calculation means 50 calculates the drive waveform at least based on the provided reference corresponding physical quantity waveform and by using the equalization characteristics that is the reciprocal of the transfer function of the system. This drive waveform is provided to the vibration generator 2 via the D/A converter 70 and the amplifier 80.

The test object 4 as the test target is placed on the vibration generator 2. The physical quantity detection sensor 6 detects the vibration of the test object 4 that is vibrated by the vibration generator 2. A displacement sensor, a velocity sensor, an acceleration sensor, a jerk sensor, or the like can be used as the vibration physical quantity detection sensor 6. The response vibration physical quantity signal (the displacement signal, the velocity signal, the acceleration signal, the jerk signal, or the like) from the vibration physical quantity detection sensor 6 is converted into the response physical quantity waveform as digital data by the A/D converter 10. The response physical quantity waveform is the data in which the characteristics of the vibration is expressed in the dimension such as displacement, velocity, acceleration, or jerk.

The transfer function calculation means 62 of the equalization characteristics modification means 60 calculates a physical quantity transfer function at least based on the response physical quantity waveform and the drive waveform. That is, the transfer function calculation means 62 calculates the spectrum of the response physical quantity waveform (including the phase information), calculates the spectrum of the drive waveform (including the phase information), and calculates a ratio therebetween as the physical quantity transfer function.

The transfer function conversion means 64 differentiates (or integrates) this physical quantity transfer function, converts the differentiated (or integrated) physical quantity transfer function to have the same dimension as the dimension of the physical quantity of the reference waveform, and thereby acquires the corresponding physical quantity transfer function. The inverse transfer function calculation means 66 calculates the reciprocal of the corresponding physical quantity transfer function and sets the reciprocal as the equalization characteristics for the calculation of the drive waveform.

As it has been described so far, even in the case where the dimension of the reference waveform differs from the dimension detected by the sensor 6, the control can be executed such that the test object vibrates in the manner that the waveform thereof matches the reference waveform.

2.2 Hardware Configuration

The hardware configuration is the same as that illustrated in FIG. 2.

2.3 Vibration Control Processing

Figure 15:
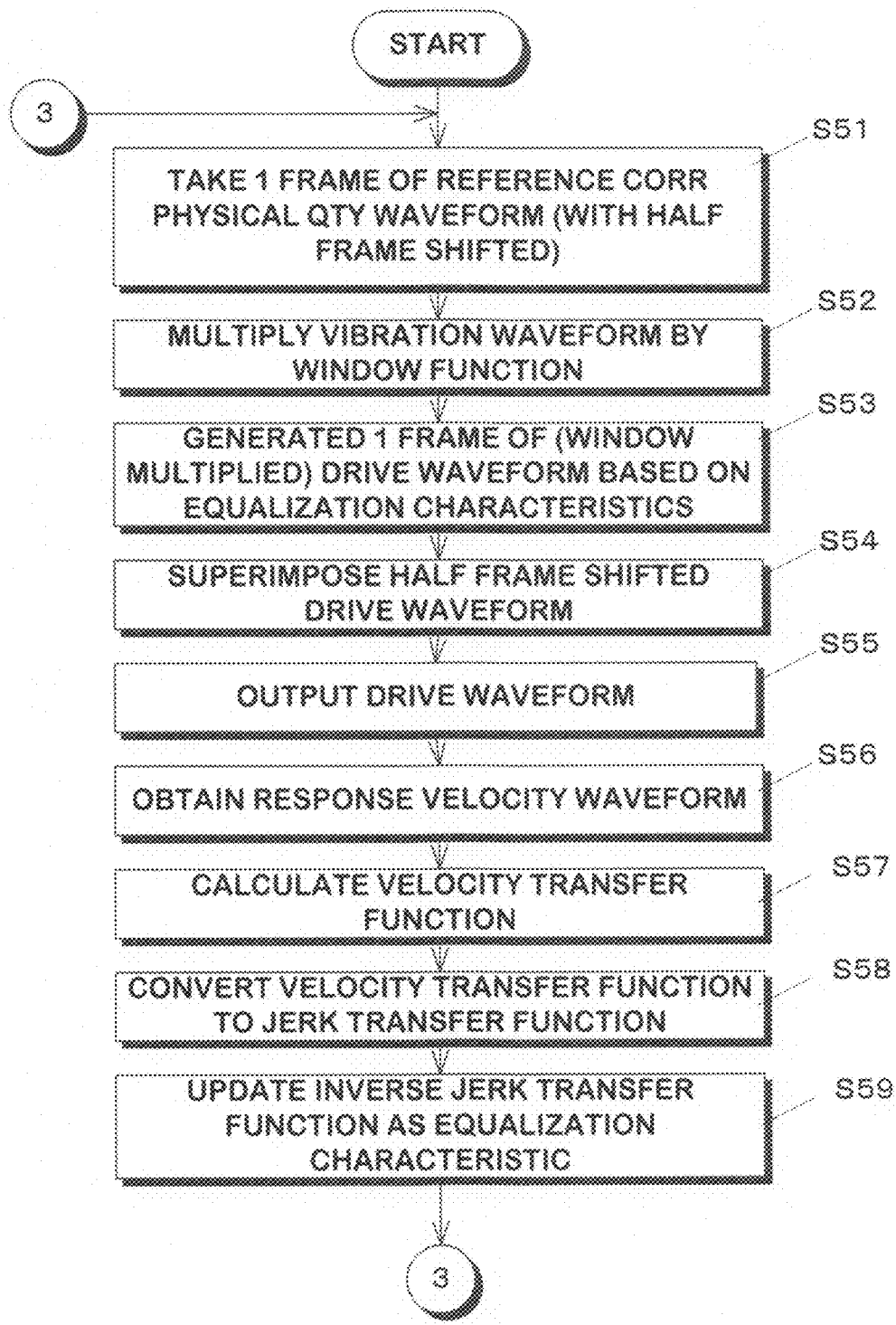
FIG. 15 is a flowchart of the vibration control program.

FIG. 15 illustrates a flowchart of the control program 98 (see FIG. 2). A description will herein be made on, as an example, a case where the physical quantity detection sensor 6 is the velocity sensor and a reference jerk waveform is provided as a reference physical quantity waveform.

The CPU 90 takes out a single frame from the reference jerk waveform (step S51). However, the CPU 90 takes out the reference jerk waveform by shifting the reference jerk waveform by ½ frame.

The CPU 90 performs convolution operation on waveform data acquired by multiplying the single frame of the reference jerk waveform, which is taken out by Hanning windowing, by using the impulse response as the equalization characteristics, so as to generate the drive signal (steps S52, S53). In this embodiment, as the equalization characteristics, the inverse characteristics of the transfer function of the system including the vibration generator 2 and the test object 4 is used. In order to vibrate the test object 4 with the reference jerk waveform, the convolution operation is performed on the jerk waveform for control by using the impulse response, which corresponds to the inverse characteristics of the transfer function, so as to generate the waveform as the drive waveform. In this way, the test object 4 can be vibrated so as to its jerk waveform matches with the reference jerk waveform.

The CPU 90 shifts the single frame of the drive signal, which is obtained by the multiplication of the window function and shifting by ½ frame, by ½ frame again and superimposes the drive signal (the overlapping processing, steps S52, S54). In this way, the CPU 90 generates the continuous drive waveform and outputs this drive waveform to the amplifier 80 via the output D/A converter 70 (step S55).

As a result, the vibration generator 2 is provided with the drive signal that is amplified by the amplifier 80, and thus can vibrate the test object 4.

Next, the CPU 90 acquires the response velocity waveform from the acceleration sensor 6 (step S56). The CPU 90 calculates the velocity transfer function of the system at least based on the provided drive waveform and the corresponding response velocity waveform (step S57). That is, a response velocity signal is subjected to the FFT to calculate the velocity spectrum (including the phase information), and the drive waveform is subjected to the FFT to calculate the drive spectrum (including the phase information). As a ratio between the velocity spectrum and the drive spectrum, the velocity transfer function is calculated from both of the velocity spectrum and the drive spectrum.

Next, this velocity transfer function is differentiated twice in the frequency domain and is converted into a jerk transfer function (step S58). That is, the velocity transfer function is converted into the jerk transfer function as a ratio between jerk spectrum and the drive spectrum. A reciprocal of the jerk transfer function, which is calculated, is updated as the equalization characteristics (step S59). This equalization characteristics is used when the drive signal is generated next time.

The CPU 90 repeatedly executes the processing that has been described so far. In this way, the test object 4 can vibrate having the property required by the provided reference jerk waveform.

2.4 Other (1) In the above embodiment, as illustrated in FIG. 14, the equalization characteristics modification means 60 includes the transfer function calculation means 62, the transfer function conversion means 64, and the inverse transfer function calculation means 66.

However, as illustrated in FIG. 16, the equalization characteristics modification means 60 may include the conversion means 61, the transfer function calculation means 62, and the inverse transfer function calculation means 66. The conversion means 61 converts the response physical quantity waveform into response corresponding physical quantity waveform. The transfer function calculation means 62 calculates the corresponding physical quantity transfer function at least based on the drive waveform and the response corresponding physical quantity waveform. The inverse transfer function calculation means 66 calculates the reciprocal of the corresponding physical quantity transfer function as the equalization characteristics.

Figure 17:
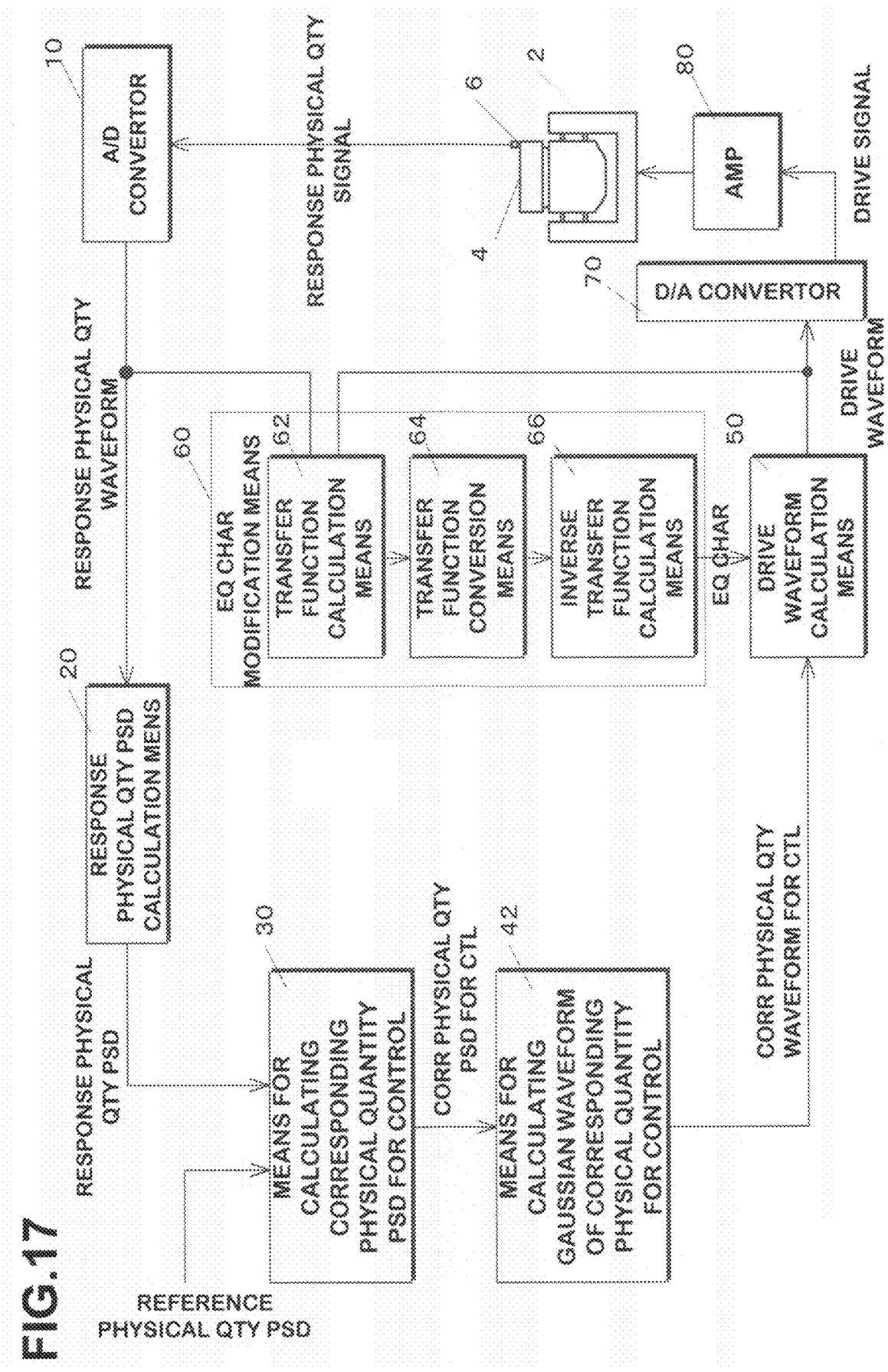
FIG. 17 is a functional block diagram of a vibration control system according to another example.

(2) The waveform control in the above embodiment (the control for making the test object vibrate just as the reference waveform itself) can be used in a control loop of the PSD control. For example, as illustrated in FIG. 17, the waveform control can be executed in the different dimension from the dimension of the reference physical quantity PSD. Differing from FIG. 1, in FIG. 17, the non-Gaussian control is not executed.

Figure 18:
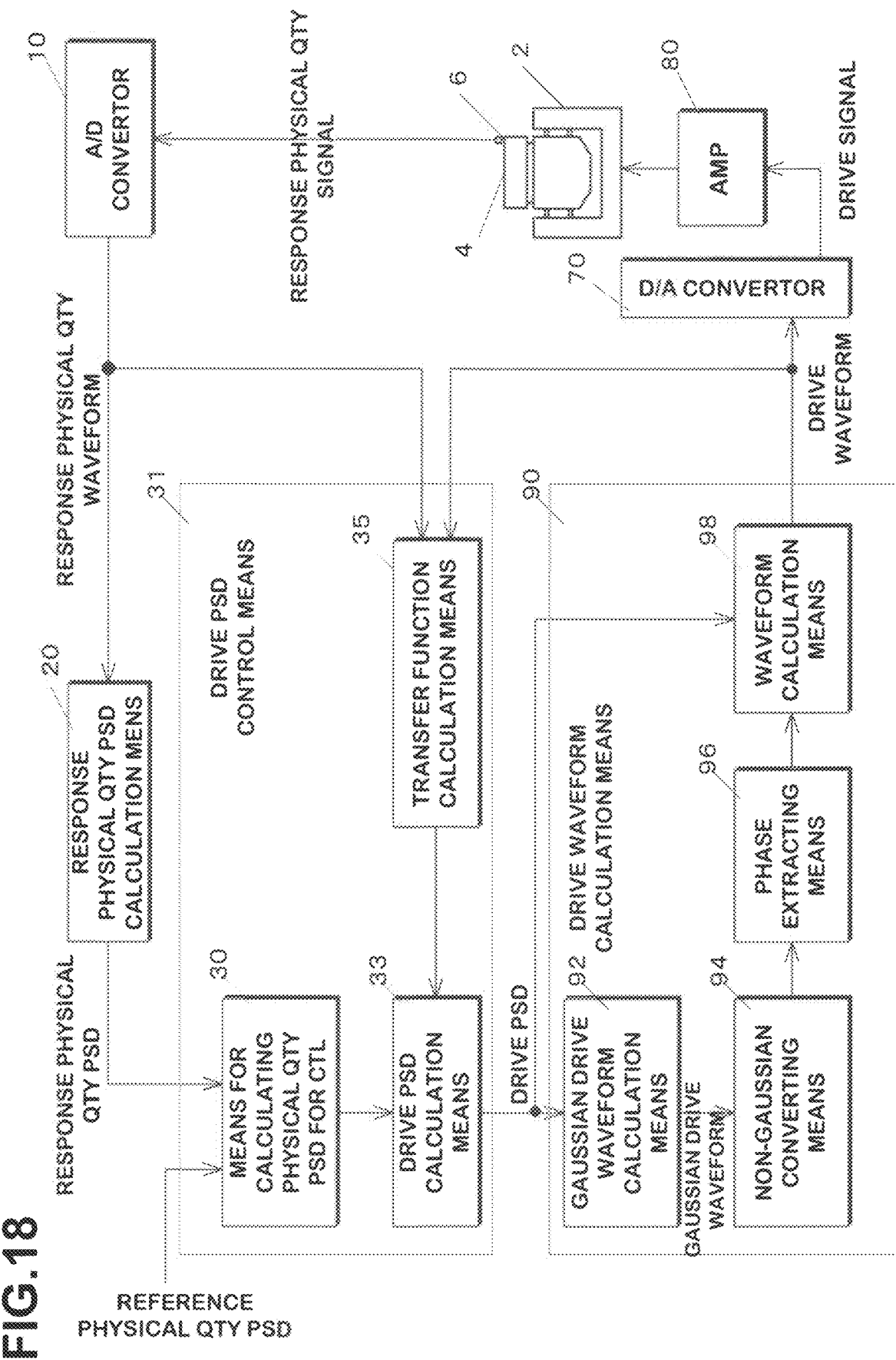
FIG. 18 is a functional block diagram of a vibration control system according to yet another example.

(3) FIG. 18 is a functional block diagram according to further another embodiment. In this embodiment, processing is executed to make the drive waveform have a non-Gaussian property (by limiting the peak value or the like).

In this embodiment, control is executed such that the test object 4 vibrates in a manner that a response physical quantity PSD matches the provided reference physical quantity PSD. The reference PSD of the dimension is the same as the dimension of the physical quantity that is detected by the sensor 6 attached to the test object 4.

The test object 4 as the test target is placed on the vibration generator 2. The vibration physical quantity detection sensor 6 detects the vibration of the test object that is vibrated by the vibration generator 2. A displacement sensor, a velocity sensor, an acceleration sensor, a jerk sensor, or the like can be used as the vibration physical quantity detection sensor 6. The signal representing the response vibration physical quantity (the displacement signal, the velocity signal, the acceleration signal, the jerk signal, or the like) from the vibration physical quantity detection sensor 6 is converted into the response physical quantity waveform as digital data by the A/D converter 10. The response physical quantity waveform is the data in which the characteristics of the vibration is expressed in the dimension such as displacement, velocity, acceleration, or jerk.

The response physical quantity PSD calculation means 20 performs the Fast Fourier Transform (FFT) on the response physical quantity waveform to calculate the response physical quantity PSD thereof. Drive PSD control means 31 calculates the drive PSD at least based on the response physical quantity PSD, the reference physical quantity PSD, the response physical quantity waveform, and the drive waveform.

In this embodiment, the drive PSD control means 31 includes the means 30 for calculating physical quantity PSD for control, drive PSD calculation means 33, and transfer characteristics calculation means 35. The means 30 for calculating corresponding vibration physical quantity PSD for control calculates the physical quantity PSD for control such that the response physical quantity PSD matches the reference physical quantity PSD. This is because, in the case where the transfer characteristic of the system including the vibration generator 2 and the test object 4 has a non-linear characteristics, in the case where the control resolution is insufficient, or due to a reason such as statistical variations included in the actually-measured PSD data, the test object 4 vibrates differently from the vibration generated by the reference physical quantity PSD even when the vibration having the reference physical quantity PSD is applied to the vibration generator 2. Thus, the physical quantity PSD for control is successively modified and calculated such that the response physical quantity PSD matches the reference physical quantity PSD.

The transfer characteristics calculation means 35 calculates a transfer characteristics H (a transfer function) of the system at least based on the response physical quantity waveform and the drive waveform. The drive PSD calculation means 33 calculates the drive PSD at least based on the physical quantity PSD for control and in consideration of the transfer characteristics H. That is, the drive PSD is calculated by multiplying the physical quantity PSD for control by $1/H^2$.

Drive waveform calculation means 90 generates the non-Gaussian drive waveform at least based on this drive PSD.

In this embodiment, the drive waveform calculation means 90 includes Gaussian drive waveform calculation means 92, non-Gaussian conversion means 94, phase extraction means 96, and waveform calculation means 98.

The Gaussian drive waveform calculation means 92 provides the uniform random phase to the drive PSD, so as to calculate the Gaussian drive waveform. The non-Gaussian conversion means 94 makes the Gaussian drive waveform have the non-Gaussian property at least based on the prescribed non-Gaussian characteristics, so as to calculate the non-Gaussian random waveform. For example, the non-Gaussian conversion means 94 converts the amplitude of the drive waveform by using a ZMNL function or the like, and performs the operation (clipping) to limit the amplitude of the drive waveform such that the amplitude (the absolute value) does not exceed a prescribed value.

The phase extraction means 96 calculates frequency characteristics of the phase of this non-Gaussian random waveform. The waveform calculation means 98 calculates the non-Gaussian drive waveform at least based on the drive PSD and this phase information, and sets this non-Gaussian drive waveform as the drive waveform.

Accordingly, it is possible to provide the test object 4 with the vibration that matches the reference physical quantity PSD while the drive waveform is made to have a non-Gaussian property.

In the above description, the physical quantity PSD for control is calculated, and the drive PSD is calculated on the basis thereof. However, the drive PSD may directly be calculated at least based on the reference physical quantity PSD, the response physical quantity PSD, and the transfer function.

In addition, processing contents by the drive waveform calculation means 90 are the same as those of the means 40 for calculating corresponding physical quantity waveform for control. Thus, the before mentioned modified example related to the means 40 for calculating corresponding physical quantity waveform for control can be applied thereto.

(4) Each of the above modified examples can be combined with the other(s) of the modified examples or can be applied to another embodiment unless contrary to the nature thereof.

What is claimed is:

1. A vibration control system comprising:
a vibration physical quantity detection sensor configured to detect a vibration physical quantity of a test object that is vibrated by a vibration generator operated on the basis of a drive waveform, wherein the vibration physical quantity represents a vibration expressed as a first dimension;
a processor, memory and instructions, the instructions when executed:
determine a response vibration physical quantity PSD (Power Spectral Density) by subjecting a response vibration physical quantity waveform from the vibration physical quantity detection sensor to a Fourier transform;
determine a corresponding vibration physical quantity PSD for control, wherein the vibration physical quantity PSD for control represents a vibration expressed as a second different, dimension, which corresponds to vibration physical quantity PSD for control, on the basis of the response vibration physical quantity PSD and a reference vibration physical quantity PSD;
determine a non-Gaussian random waveform of the corresponding vibration physical quantity for control by subjecting spectrum data, which is generated from the corresponding vibration physical quantity PSD for control, to an inverse Fourier transform in order to obtain desired non-Gaussian characteristics, and set the non-Gaussian random waveform of the corresponding vibration physical quantity for control as a corresponding vibration physical quantity waveform for control;
determine the drive waveform for the vibration generator on the basis of the corresponding vibration physical quantity waveform for control with inverse characteristics of transfer characteristics of at least the vibration generator and the test object as equalization characteristics; and
modify the equalization characteristics on the basis of the drive waveform and the response vibration physical quantity waveform, and
outputting the drive waveform, via a drive signal, to the vibration generator to test the test object,
wherein:
the vibration physical quantity detection sensor is configured to detect any one of a displacement, a velocity, an acceleration, or a jerk associated with a vibration of the test object,
the response vibration physical quantity PSD has a selected dimension of a displacement PSD, a velocity PSD, an acceleration PSD, or a jerk PSD, and
the corresponding vibration physical quantity PSD for control of the second, different dimension is any one of the displacement PSD, the velocity PSD, the acceleration PSD or the jerk PSD, with the second, different dimension being different from the selected dimension of the response vibration physical quantity PSD.

2. The system according to claim 1, wherein
the instructions that determine the corresponding vibration physical quantity PSD for control include:
instructions that determine a vibration physical quantity PSD for control by comparing the response vibration physical quantity PSD and the reference vibration physical quantity PSD such that the response vibration physical quantity PSD is equal to the reference vibration physical quantity PSD; and
instructions that convert the vibration physical quantity PSD for control into the corresponding vibration physical quantity PSD for control of the second, different dimension.

3. The system according to claim 1, wherein
the instructions that calculate the corresponding vibration physical quantity PSD for control include:
instructions that convert the response vibration physical quantity PSD into response corresponding vibration physical quantity PSD of the second, different dimension;

instructions that convert the reference vibration physical quantity PSD into reference corresponding vibration physical quantity PSD of the second, different dimension; and instructions that modify the corresponding vibration physical quantity PSD for control by comparing the response corresponding vibration physical quantity PSD and the reference corresponding vibration physical quantity PSD such that the response corresponding vibration physical quantity PSD is equal to the reference corresponding vibration physical quantity PSD.

4. The system according to claim 1, wherein the instructions that convert the corresponding vibration physical quantity waveform for control include:

instructions that acquire a Gaussian random waveform of the corresponding vibration physical quantity for control by subjecting amplitude spectrum data, which is generated from the corresponding vibration physical quantity PSD for control, to the inverse Fourier transform by providing uniformly distributed random phases;

instructions that convert the Gaussian random waveform of the corresponding vibration physical quantity for control into a non-Gaussian random waveform on the basis of non-Gaussian conversion characteristics;

instructions that extract a phase of each frequency component as a non-Gaussian signal phase by subjecting the non-Gaussian random waveform to the Fourier transform; and instructions that determine a non-Gaussian random waveform of the corresponding vibration physical quantity for control by subjecting the corresponding vibration physical quantity PSD for control to the inverse Fourier transform by providing the non-Gaussian signal phase.

5. The system according to claim 4, wherein
the non-Gaussian conversion characteristic is a characteristic that limits a peak value such that the Gaussian random waveform of the corresponding vibration physical quantity for control does not exceed a prescribed limit value, and when the Gaussian random waveform of the corresponding vibration physical quantity for control does not exceed the limit value, said Gaussian random waveform of the corresponding vibration physical quantity for control is used as the non-Gaussian random waveform of the corresponding vibration physical quantity for control.

6. The system according to claim 1, wherein
the instructions that determine the corresponding vibration physical quantity waveform for control include:

instructions that acquire a Gaussian random waveform of a corresponding vibration physical quantity for control by subjecting amplitude spectrum data, which is generated from the corresponding vibration physical quantity PSD for control, to the inverse Fourier transform by providing uniformly distributed random phases; and instructions that convert the Gaussian random waveform of the corresponding vibration physical quantity for control into a non-Gaussian random waveform on the basis of non-Gaussian conversion characteristics such that the non-Gaussian random waveform of the corresponding vibration physical quantity for control is obtained.

7. The system according to claim 6, wherein the non-Gaussian conversion characteristics is a ZMNL function.

8. The system according to claim 1, wherein
the instructions that determine the drive waveform perform a convolution operation on the corresponding vibration physical quantity waveform for control by using impulse response as the equalization characteristics, so as to calculate the drive waveform, and the instructions that modify the equalization characteristics calculate the equalization characteristic as a reciprocal of a value obtained by dividing the corresponding vibration physical quantity with the vibration physical quantity transfer function, on the basis of a spectrum of a response corresponding vibration physical quantity waveform, which is converted from the response vibration physical quantity waveform, and a spectrum of the drive waveform.

9. The system according to claim 8, wherein
the instructions that modify the equalization characteristic include:

instructions that determine the vibration physical quantity transfer function on the basis of the drive waveform and the response vibration physical quantity waveform;

instructions that convert the vibration physical quantity transfer function into the corresponding vibration physical quantity transfer function; and instructions that determine the equalization characteristic as a reciprocal of the corresponding vibration physical quantity transfer function.

10. The system according to claim 8, wherein
the instructions that determine the drive waveform include:

instructions that convert the corresponding vibration physical quantity waveform for control into a non-Gaussian random waveform of the vibration physical quantity for control; and instructions that perform the convolution operation on the physical vibration quantity waveform for control by using the impulse response with the impulse response of the system including the vibration generator and the test object as the equalization characteristics, so as to calculate the drive waveform.

11. A vibration control system comprising:
an acceleration sensor configured to detect, acceleration of a test object that is vibrated by a vibration generator operated on the basis of a drive waveform;

a processor and memory, the processor executing instructions stored in memory that:

acquire a response acceleration PSD by subjecting a response acceleration waveform from the acceleration sensor to the Fourier transform;

determine a vibration physical quantity PSD for control corresponding to acceleration PSD for control on the basis of the response acceleration PSD and reference acceleration PSD, the vibration physical quantity PSD for control being displacement PSD for control, or velocity PSD for control, or jerk PSD for control;

determine a Gaussian random waveform of a corresponding vibration physical quantity for control by subjecting amplitude spectrum data, which is generated from the displacement PSD for control, or the velocity PSD for control, or the jerk PSD for control, to the inverse Fourier transform by providing uniformly distributed random phases, Gaussian random waveform of a corresponding vibration physical quantity for control being a Gaussian random waveform of displacement for control, or a Gaussian random waveform of velocity for control, or a Gaussian random waveform of the jerk for control;

determine and provide drive waveform determination instructions with the Gaussian random waveform of displacement for control, or the Gaussian random waveform of velocity for control, or the Gaussian random waveform of jerk for control as is as a displacement waveform for control, a velocity waveform for control, or a jerk waveform for control in the case where any portion that exceeds a limit value is not present in said Gaussian random waveform of the displacement for control, said Gaussian random waveform of the velocity for control, or said Gaussian random waveform of the jerk for control in a prescribed unit period, and provide the drive waveform determination instructions with a non-Gaussian random waveform of the displacement for control, or a non-Gaussian random waveform of the velocity for control, or a non-Gaussian random waveform of the jerk for control, which is determined by a non-Gaussian conversion instructions, non-Gaussian signal phase extraction instructions, and waveform calculation instructions, as the displacement waveform for control, the velocity waveform for control, or the jerk waveform for control in the case where the portion that exceeds the limit value is present;

determine the drive waveform on the basis of the displacement waveform for control, the velocity waveform for control, or the jerk waveform for control with inverse characteristics of transfer function of a system including a vibration generator and the test object as equalization characteristics;

output the drive waveform, via a drive signal, to the vibration generator to test the test object;

determine an acceleration transfer function on the basis of the drive waveform and the response acceleration waveform;

convert the acceleration transfer function into a displacement transfer function, a velocity transfer function, or a jerk transfer function; and determine the equalization characteristics as a reciprocal of the displacement transfer function, the velocity transfer function, or the jerk transfer function.

12. A vibration control system configured to vibrate a test object in a manner to match a reference vibration physical quantity waveform of a second dimension that differs from a first dimension of a drive waveform for vibrating the test object and of a response vibration physical quantity waveform, with which vibration of the test body is detected, the vibration control system comprising:

a vibration physical quantity detection sensor which detects a vibration physical quantity of the test object that is vibrated by a vibration generator operated on the basis of the drive waveform, so as to output the response vibration physical quantity waveform;

a processor, memory and instructions, the instructions when executed:

determine and output the drive waveform configured to drive the vibration generator on the basis of the reference vibration physical quantity waveform by using equalization characteristics as inverse characteristics of transfer characteristics of at least the vibration generator and the test object; and modify the equalization characteristic as a reciprocal of a second dimension transfer function on the basis of the response vibration physical quantity waveform and the drive waveform, the second dimension transfer function being a ratio between a spectrum of the drive waveform and a spectrum of a second response vibration physical quantity waveform, which is acquired by converting the response vibration physical quantity waveform into that of the second dimension, wherein the vibration physical quantity represents a vibration expressed as the first dimension and wherein the reference vibration physical quantity waveform of a second dimension represents a vibration expressed as a second, different dimension.

* * * * *